(12) United States Patent
Gagnon et al.

(10) Patent No.: US 9,956,982 B1
(45) Date of Patent: May 1, 2018

(54) ADJUSTABLE SKI FOR A SNOWMOBILE

(71) Applicant: BOMBARDIER RECREATIONAL PRODUCTS INC., Valcourt (CA)

(72) Inventors: Pascal Gagnon, Valcourt (CA); Nicolas Bedard, Granby (CA); Stuart Santry, Rovaniemi (FI); Jose Boisjoli, Drummondville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 541 days.

(21) Appl. No.: 14/541,306

(22) Filed: Nov. 14, 2014

Related U.S. Application Data

(60) Provisional application No. 61/904,222, filed on Nov. 14, 2013.

(51) Int. Cl.
    *B62B 17/02* (2006.01)
    *B62M 27/02* (2006.01)

(52) U.S. Cl.
    CPC ............. *B62B 17/02* (2013.01); *B62M 27/02* (2013.01); *B62M 2027/025* (2013.01)

(58) Field of Classification Search
    CPC .. B62B 17/02; B62M 27/02; B62M 2027/025
    USPC ...... 180/180, 186, 190; 280/28, 8, 9, 10, 13, 280/900
    See application file for complete search history.

(56) References Cited

U.S. PATENT DOCUMENTS

| | | | |
|---|---|---|---|
| 2,741,487 A | 4/1956 | Carefoot | |
| 3,632,126 A | 1/1972 | Shorrock | |
| 3,645,347 A | 2/1972 | Brant | |
| 3,711,109 A | 1/1973 | Hofbauer | |
| 3,866,933 A | 2/1975 | Mollring | |
| 3,870,331 A | 3/1975 | Cryderman | |
| 6,971,653 B2 | 12/2005 | Takahiko | |
| 7,287,763 B1 * | 10/2007 | Beaudoin | B62B 17/02 280/11.12 |
| 7,413,197 B2 * | 8/2008 | Haruna | B62M 27/02 280/28 |
| 8,240,417 B2 * | 8/2012 | Takata | B62D 3/00 180/190 |
| 9,499,189 B2 * | 11/2016 | Laurence | B62B 17/02 |

(Continued)

FOREIGN PATENT DOCUMENTS

| CA | 220836 A | 7/1922 |
|---|---|---|
| CA | 232374 A | 7/1923 |

(Continued)

*Primary Examiner* — Anne Marie M Boehler
(74) *Attorney, Agent, or Firm* — BCF LLP

(57) ABSTRACT

A ski includes a longitudinal ski body having an upper surface and a lower snow-contacting surface. A longitudinal slot extends from the upper surface to the lower surface. A longitudinal keel, having at least a portion selectively extending in the slot, is adapted to connect pivotably to a ski leg of the snowmobile. The ski body is connected to the keel and adapted thereby to connect to the ski leg. At least a portion of the ski body is selectively movable with respect to the keel. The ski body is thereby selectively disposed in any one of a plurality of ski body positions, each of the plurality of ski body positions being defined at least by a position of the slot with respect to the keel. A fastener retains the ski body in any one of the ski body positions. Ski assemblies and snowmobiles having the ski are also disclosed.

22 Claims, 20 Drawing Sheets

(56) References Cited

U.S. PATENT DOCUMENTS

2003/0151216 A1* 8/2003 Takahiko ............... B62M 27/02
                                                                                               280/28
2003/0189302 A1   10/2003  Makitalo
2011/0089649 A1* 4/2011 Wrightman ............. B62B 17/02
                                                                                               280/28

FOREIGN PATENT DOCUMENTS

| CA | 253557 A | 9/1925 |
|----|----------|--------|
| CA | 517048 A | 10/1955 |
| CA | 828641 A | 12/1969 |
| CA | 897747 A | 4/1972 |
| CA | 898310 A | 4/1972 |

* cited by examiner

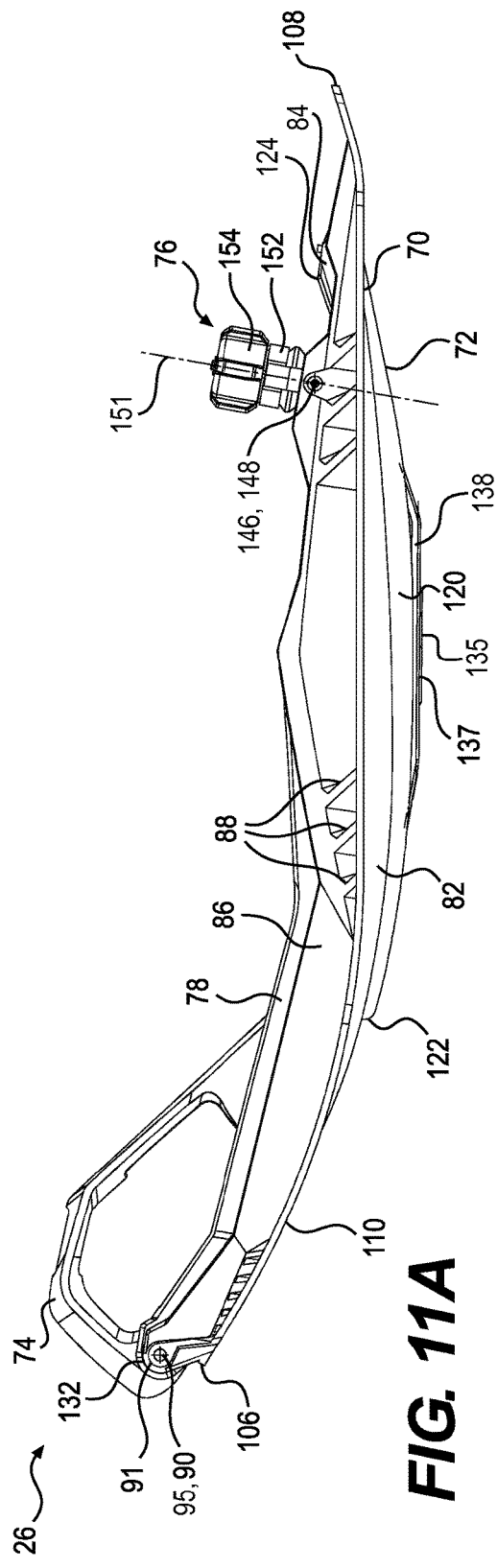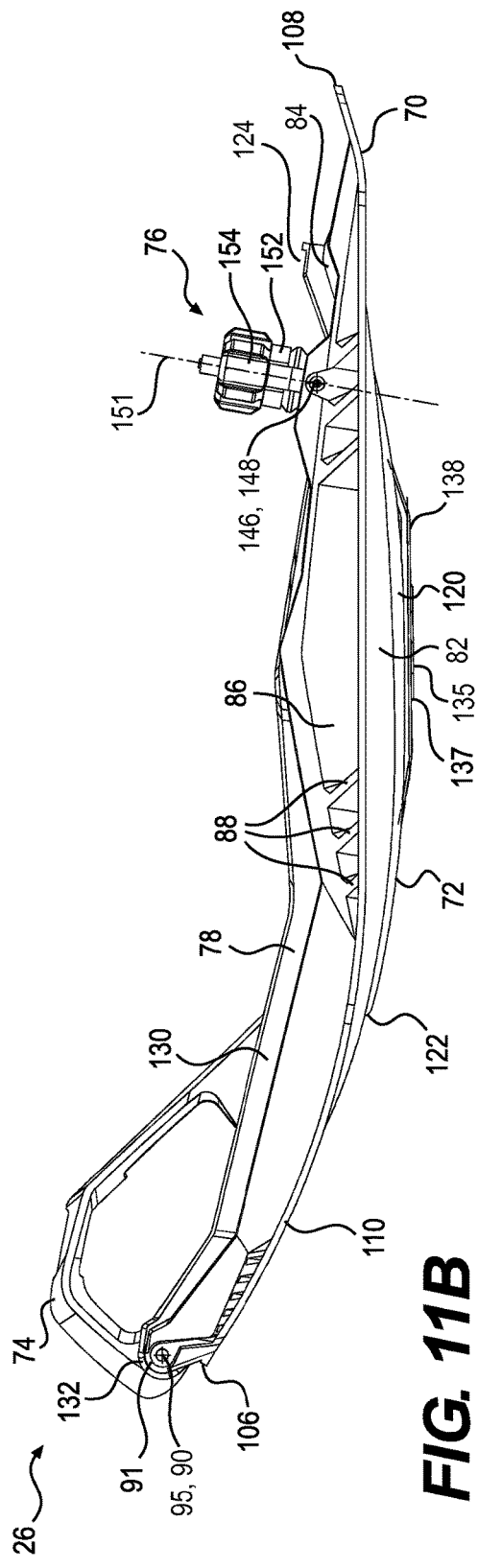

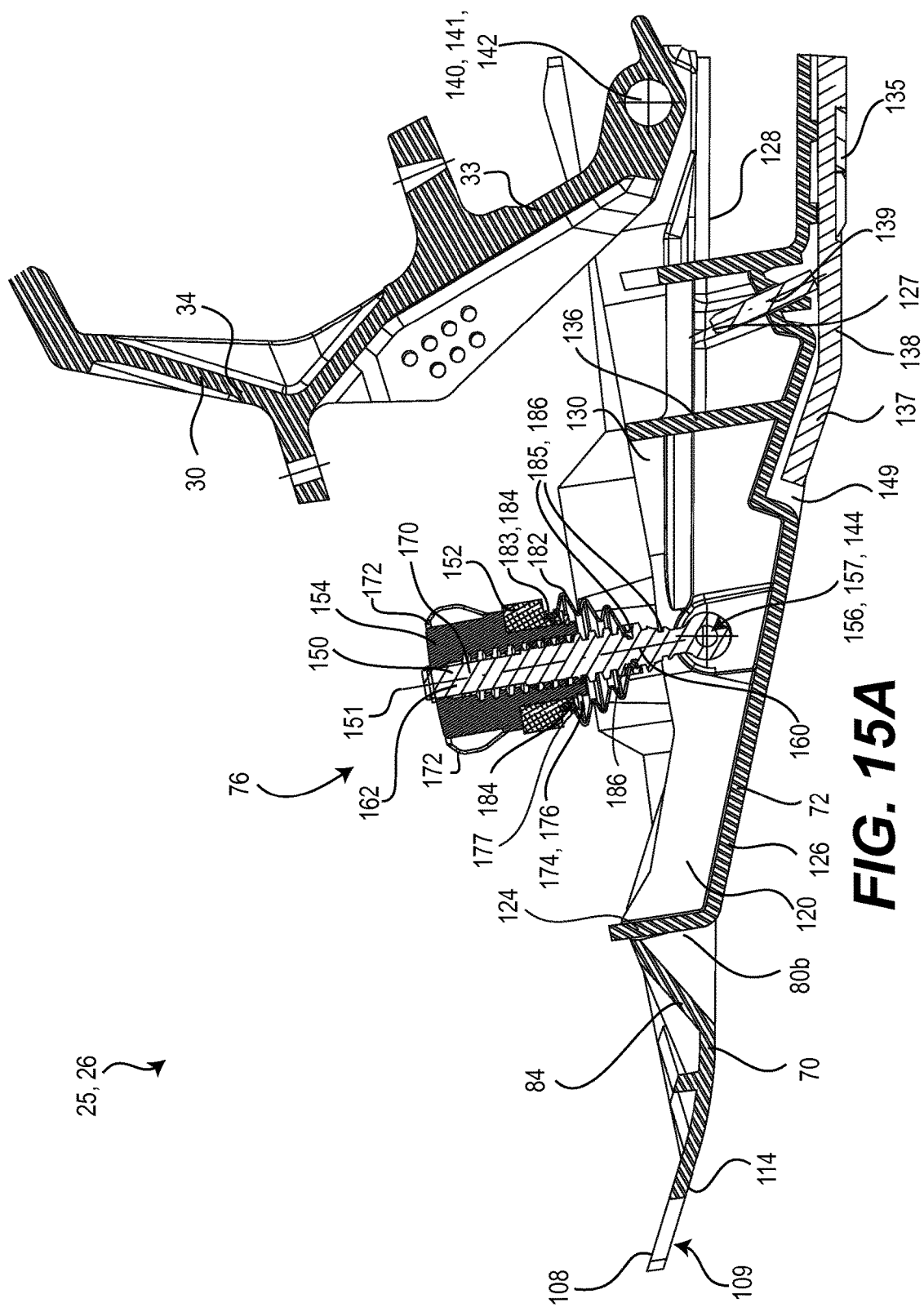

ADJUSTABLE SKI FOR A SNOWMOBILE

CROSS-REFERENCE

The present application claims priority to U.S. Provisional Patent Application No. 61/904,222 filed on Nov. 14, 2013, the entirety of which is incorporated herein by reference.

TECHNICAL FIELD

The present technology relates to adjustable skis for snowmobiles, and to snowmobiles incorporating adjustable skis.

BACKGROUND

Snowmobiles are commonly used for sport, recreational, and utilitarian purposes. Snowmobiles are used for riding on well-groomed trails, on fresh snow or on ice, on level ground and on slopes. Snowmobiles can be used to transport one or two passengers, and varying amounts of cargo in addition to passengers. Snowmobiles are thus subjected to varying amounts of loads and riding conditions.

When snowmobiles travel on packed snow or ice, such as on well-groomed trails, the snowmobiles skis are firmly supported by the ground, and thus flotation is not a concern. Snowmobiles skis are not as well supported by unpacked or powder snow, and thus flotation can be a bigger concern for travel on such surfaces. In general wider skis are better suited for flotation of the snowmobile. Wider skis however are less effective for steering the snowmobile.

Snowmobiles skis are typically provided with keels extending below to aid in steering the snowmobile. Steering effectiveness and responsiveness of the steering assembly increases with depth of the keel below the skis. Deeper keels are therefore desired for aggressive riding of the snowmobile or when the riding surface is covered with soft-packed snow so the keel can extend down through the soft-packed snow into the harder-packed snow. However, deeper keels also increase the load on the steering assembly, and on the driver controlling the handlebar of the steering assembly when riding on hard-packed snow or ice. Therefore, in situations such as on longer rides, or where less aggressive riding is desired, it may be desirable to have skis with keels of a reduced depth. It is however inconvenient to replace the snowmobile skis according to changes in load requirements and riding conditions since the changes may occur while riding.

Therefore, there is a need for a ski for a snowmobile that can be easily adjusted for operation of the snowmobile in different driving conditions, and that can also be easily replaced if necessary.

SUMMARY

One object of the present technology is to ameliorate at least some of the inconveniences of the prior art.

According to one aspect of the present technology, there is provided a ski for a snowmobile. The ski includes a longitudinal ski body having an upper surface and a lower snow-contacting surface. A longitudinal slot in the ski body extends from the upper surface to the lower surface. A longitudinal keel is adapted to connect pivotably to a ski leg of the snowmobile. At least a portion of the keel selectively extends in the slot. The ski body is connected to the keel and adapted thereby to connect to the ski leg. At least a portion of the ski body is selectively movable with respect to the keel. The ski body is thereby selectively disposed in any one of a plurality of ski body positions, each of the plurality of ski body positions being defined at least by a position of the slot with respect to the keel. A fastener retains the ski body in any one of the ski body positions.

In some implementations, the ski body is selectively pivotable with respect to the keel about a ski body pivot axis.

In some implementations, the ski body pivot axis extends through a forward portion of the ski body. The at least one portion of the ski body selectively moveable with respect to the keel includes a rear portion of the ski body.

In some implementations, a ski adjuster moves the at least one portion of the ski body to selectively dispose the ski body in any one of a plurality of ski body positions. The ski adjuster is coupled to the ski body and the keel.

In some implementations, the ski adjuster is connected to a rearward portion of the ski body.

In some implementations, the ski adjuster includes an adjustment screw engaging a plurality of threads defined in one of the ski adjuster, the keel, and the ski body. Advancing or retracting the adjustment screw along the plurality of threads moves the ski body with respect to the keel to thereby selectively move the ski body from one of the plurality of ski body positions to another of the plurality of ski body positions.

In some implementations, the ski body is selectively pivotable, with respect to the keel, about a ski body pivot axis.

In some implementations, a ski leg pivot axis is defined by the keel. The ski leg pivot axis is located longitudinally between the ski body pivot axis and the ski adjuster.

In some implementations, a handle extends upwards from the keel and the ski body pivot axis extends through the ski body, the handle, and the keel.

In some implementations, a skag is connected to a bottom surface of the keel.

In some implementations, at least one side portion extends upwards from the upper surface of the ski body, each of the at least one side portion extending on one of a left side and a right side of the keel.

In some implementations, a forward portion of the ski body curves upwardly.

In some implementations, a forward portion of the keel curves upwardly.

In some implementations, a ski leg mounting bracket is included to connect the keel to the ski leg. The ski leg mounting bracket extends above the keel. The ski leg mounting bracket is rigidly connected to the keel, and adapted to pivotably connect to the ski leg. In some implementations, the ski leg mounting bracket is formed integrally with the keel. In some implementations, a forward portion of the ski leg mounting bracket curves upwardly. In some additional implementation, the ski body further has at least one side portion extending upwards above the upper surface of the ski body, each of the at least one side portion extending on one of a left side and a right side of the ski leg mounting bracket.

In accordance with another aspect of the present technology, there is provided a snowmobile ski assembly which includes a longitudinal ski body having an upper surface and a lower snow-contacting surface, a slot extending longitudinally in the ski body from the upper surface to the lower surface, a longitudinal keel with a portion of the keel selectively extending below the slot, and a ski leg extending upwards from the keel and pivotably connected thereto. The ski body is connected to the keel. At least a portion of the ski body is selectively movable with respect to the keel, the ski body being thereby selectively disposed in any one of a plurality of ski body positions. A fastener retains the ski body in any one of the ski body positions.

In accordance with yet another aspect of the present technology, there is provided a snowmobile having a frame, an engine supported by the frame, an endless track operatively connected to the engine, and at least one ski assembly as described above. For each ski assembly, the ski leg is operatively connected to the frame. For purposes of this application, terms related to spatial orientation such as forwardly, rearwardly, upwardly, downwardly, left, and right, are as they would normally be understood by a driver of the snowmobile sitting thereon in a normal riding position. Terms related to spatial orientation when describing or referring to components or sub-assemblies of the snowmobile, separately from the snowmobile, such as the ski for example, should be understood as they would be understood when these components or sub-assemblies are mounted to the snowmobile.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 11A to 11C are left side elevation views of the ski of the ski assembly of FIG. 2, with the ski body disposed in three different positions relative to the keel;

FIG. 15A is an enlarged cross-sectional view of the rear portion of the ski of FIG. 14, taken along the line J-J of FIG. 14, with the ski body in the position shown in FIG. 11A;

DETAILED DESCRIPTION

Figure 1:
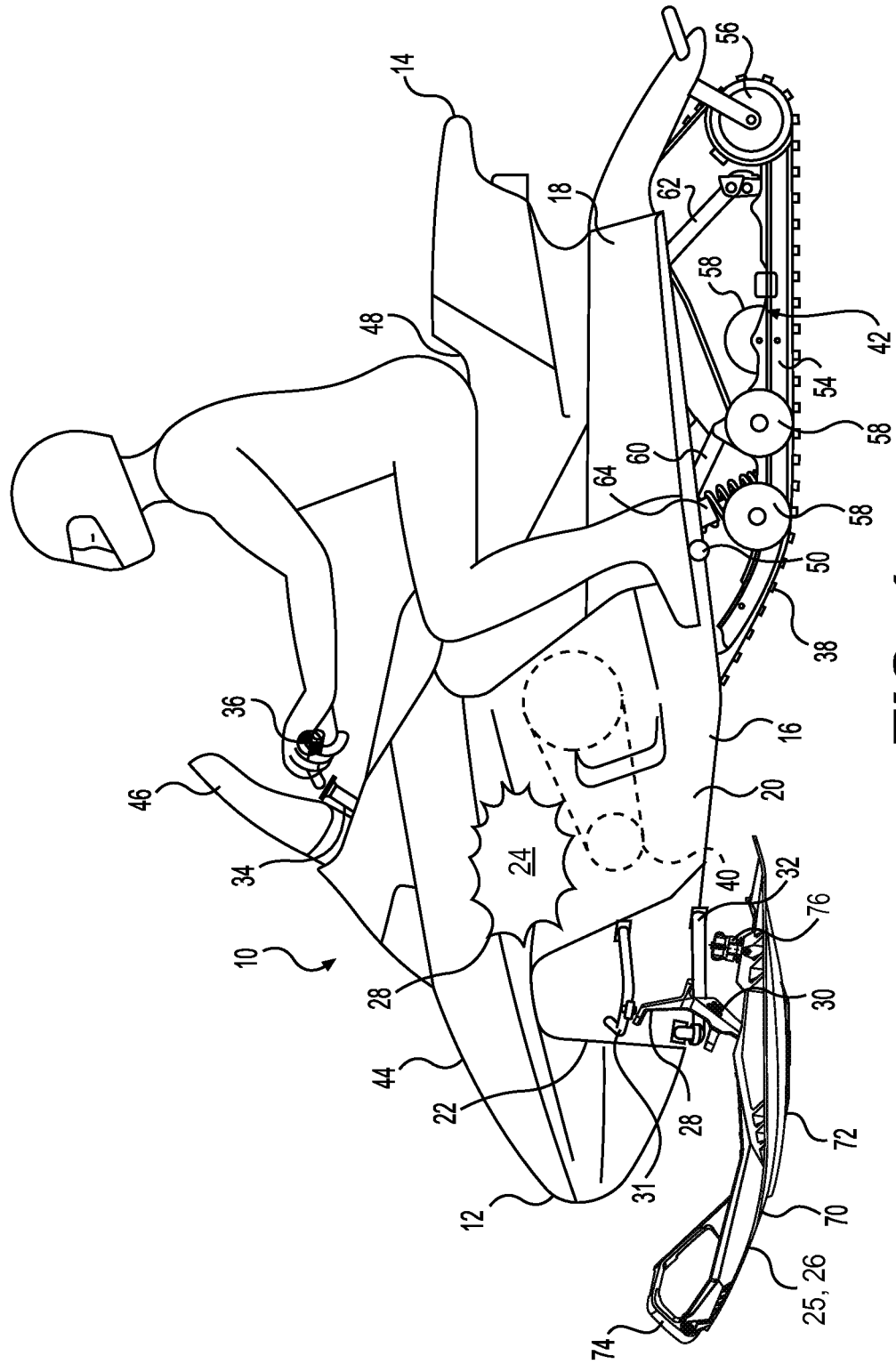
FIG. 1 is a left side elevation view of a snowmobile with a driver seated thereon in a straddling position.

With reference to FIG. 1, a snowmobile 10 will be described. Although a snowmobile 10 is presented herein, it is contemplated that aspects of the present technology could be applied to other types of vehicles having skis for operation on snow.

The snowmobile 10 includes a front end 12 and a rear end 14, which are defined consistently with the forward travel direction of the snowmobile 10. The snowmobile 10 includes a frame 16. The frame 16 includes a tunnel 18, an engine cradle portion 20 and a front suspension assembly portion 22. An engine 24, which is schematically illustrated, is supported by the engine cradle portion 20.

An endless drive track 38 is positioned at the rear end 14 of the snowmobile 10 and is disposed under the tunnel 18. The endless drive track 38 is operatively connected to the engine 24 through a belt transmission system 40 which is schematically illustrated by broken lines.

The endless drive track 38 is suspended for movement relative to the frame 16, by a rear suspension assembly 42. The rear suspension assembly 42 includes a pair of spaced apart slide rails 54, rear suspension arms 60, 62 and shock absorber 64. The slide rails 54 engage the inner side of the endless drive track 38, the rear suspension arms 60, 62 and the shock absorber 64 pivotally connect between the tunnel 18 and the slide rails 54. The endless drive track 38 is driven to run about the rear suspension assembly 42 for propulsion of the snowmobile 10. A plurality of rollers 56, 58 define the path over which the endless drive track 38 travels.

A seat 48, disposed on the tunnel 18, supports a rider. Two footrests 50 (only one of which is shown) are positioned on opposite sides of the tunnel 18 below the seat 48 to support the rider's feet. The footrests 50 are integrally formed with the tunnel 18.

Left and right ski assemblies 25 are positioned at the front end 12 of the snowmobile 10 (only the left one being shown). Each ski assembly 25 includes a ski 26 and a corresponding ski leg 30. The ski assemblies 25 are attached to the front suspension assembly portion 22 of the frame 16 via a front suspension assembly 28. The front suspension assembly 28 includes a pair of left and right upper A-arms 31 and lower A-arms 32. Each ski leg 30 is pivotably connected to the corresponding upper and lower A-arms 31, 32. It is contemplated that other types of front suspension assemblies could be used. It is contemplated that the snowmobile 10 could have only one ski 26 and one ski leg 30. The skis 26 will be described in greater detail below.

A steering assembly including a steering column 34 and handlebar 36 is provided. The steering column 34 is attached at its upper end to the handlebar 36, which is positioned forward of the rider and behind the engine 24. The steering column 34 is operatively connected to the ski legs 30 and the skis 26, in order to steer the skis 26, and the snowmobile 10, when the handlebar 36 is turned. It is contemplated that the steering column could be connected to a steering device other than the handlebar 36.

Fairings 44 are provided at the front end 12 of the snowmobile 10. The fairings 44 enclose the engine 24 and the belt transmission system 40, thereby providing an external shell that not only protects the engine 24 and the belt transmission system 40, but also make the snowmobile 10 more aesthetically pleasing. The fairings 44 include a hood and one or more side panels that can be opened to allow access to the engine 24 and the belt transmission system 40 when this is required, for inspection or maintenance of the engine 24 and/or the belt transmission system 40 for example. A windshield 46 is connected to the fairings 44 near the front end 12 of the snowmobile 10. It is contemplated that the windshield 46 could be attached directly to the handlebar 36. The windshield 46 acts as a windscreen to lessen the force of the air on the rider while the snowmobile 10 is moving forward.

Turning now to FIGS. 2 to 10, the left side ski assembly 25 of the snowmobile 10, which includes the left ski 26 and the left ski leg 30, will be described.

It should be understood that the two skis 26 are identical to each other and the two ski legs 30 are mirror images of one another. As such, the following description applies to both sides of the ski assembly 25. The manufacturing of the snowmobile 10 is simplified by having two identical skis 26. It is contemplated however that the left and right skis 26 could be mirror images of each other and/or the left and right ski legs 30 could identical.

The ski 26 includes a ski body 70, a keel 72, a handle 74 and a ski adjustor 76. The ski adjustor 76 adjusts the position of the ski body 70 relative to the keel 72.

The ski body 70 and the keel 72 are made of ultra-high molecular weight (UHMW) polyethylene. It is contemplated that the ski body 70 and the keel 72 could be made of other suitable materials.

With reference to FIGS. 2 to 6, the longitudinal ski body 70 has a front portion 100, a middle portion 102, and a rear portion 104. The ski body 70 has a front end 106 and a rear end 108. The ski body 70 has lateral edges 110 extending from the front end 106 to the rear end 108. The ski body 70 has an upper surface 112 and a lower surface 114. The ski body 70 defines a longitudinal centerline 27 for the ski 26 passing longitudinally through the center of the ski body 70.

The front portion 100 of the ski body 70 curves upwards from the middle portion 102 to the front end 106. The middle and rear portions 102, 104 are generally flat except in a portion adjacent to the rear end 108 that is angled upwards towards the rear end 108. It is contemplated that the ski body 70, or any of the portions 100, 102 106, could be curved/angled more or less than as shown in the illustrated implementation. The front portion 100, middle portion 102 and rear portion 104, each extend approximately one third of an overall length of the ski body 70. It is contemplated that the relative lengths of the front portion 100, the middle portion 102, and rear portion 104 could be different.

Figure 5:
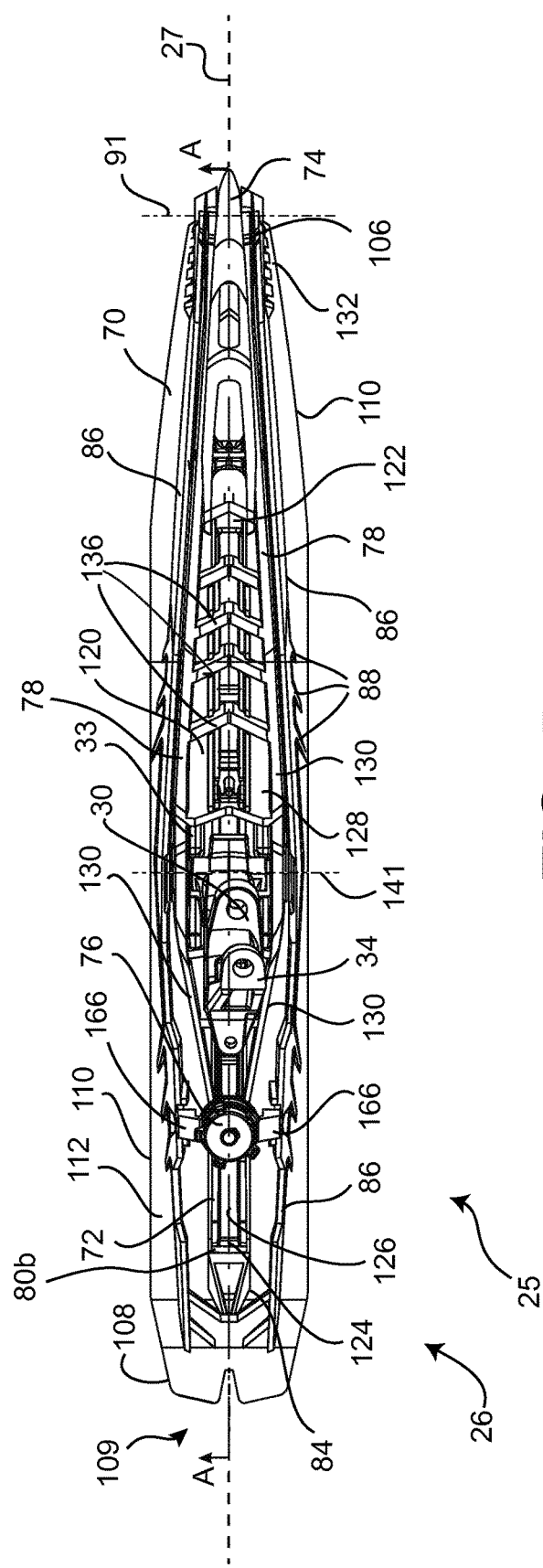
FIG. 5 is a top plan view of the ski assembly of FIG. 2.
Figure 7:
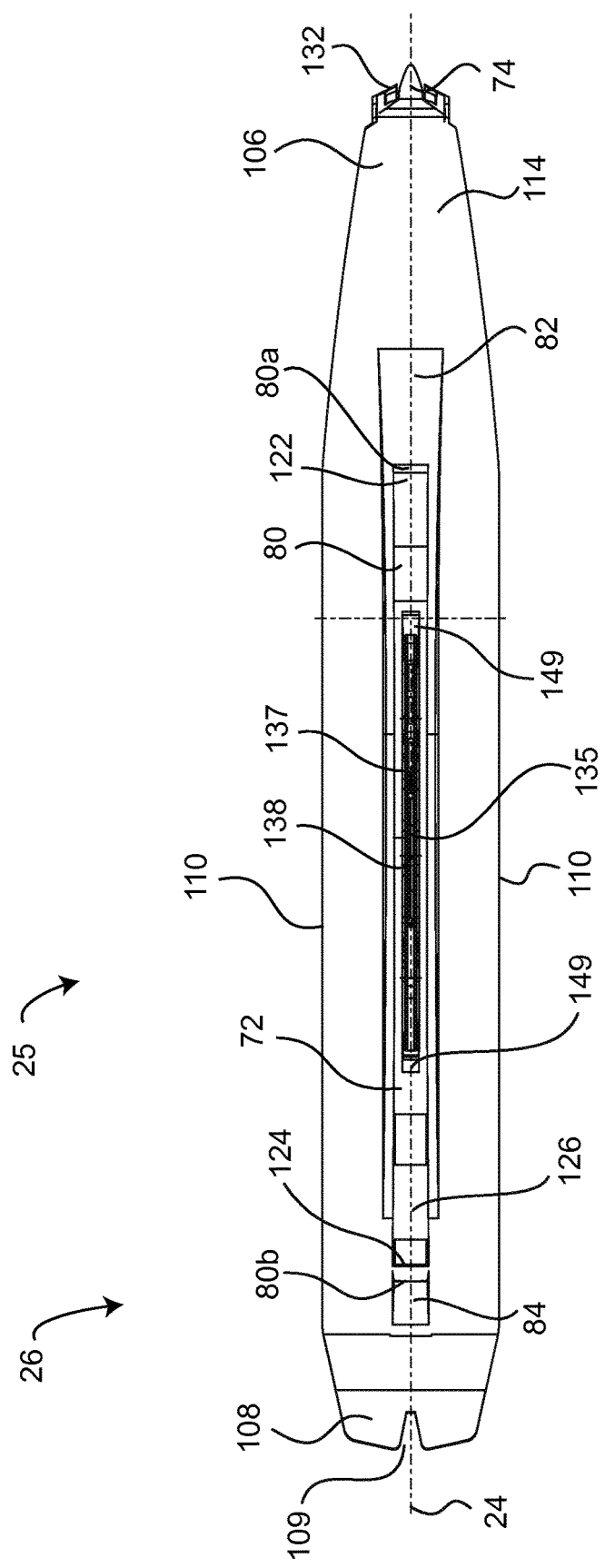
FIG. 7 is a bottom plan view of the ski assembly of FIG. 2.

With reference to FIGS. 5 and 7, the width of the ski body 70 between the lateral edges 110 is generally uniform except towards the front end 106 and the rear end 108 where it tapers. The front and rear ends 106, 108 of the ski body 70 extend generally perpendicular to the lateral edges 110, except for a notch 109 in the centre of the rear end 108. It is contemplated that the ends 106, 108 could be curved.

Figure 6:
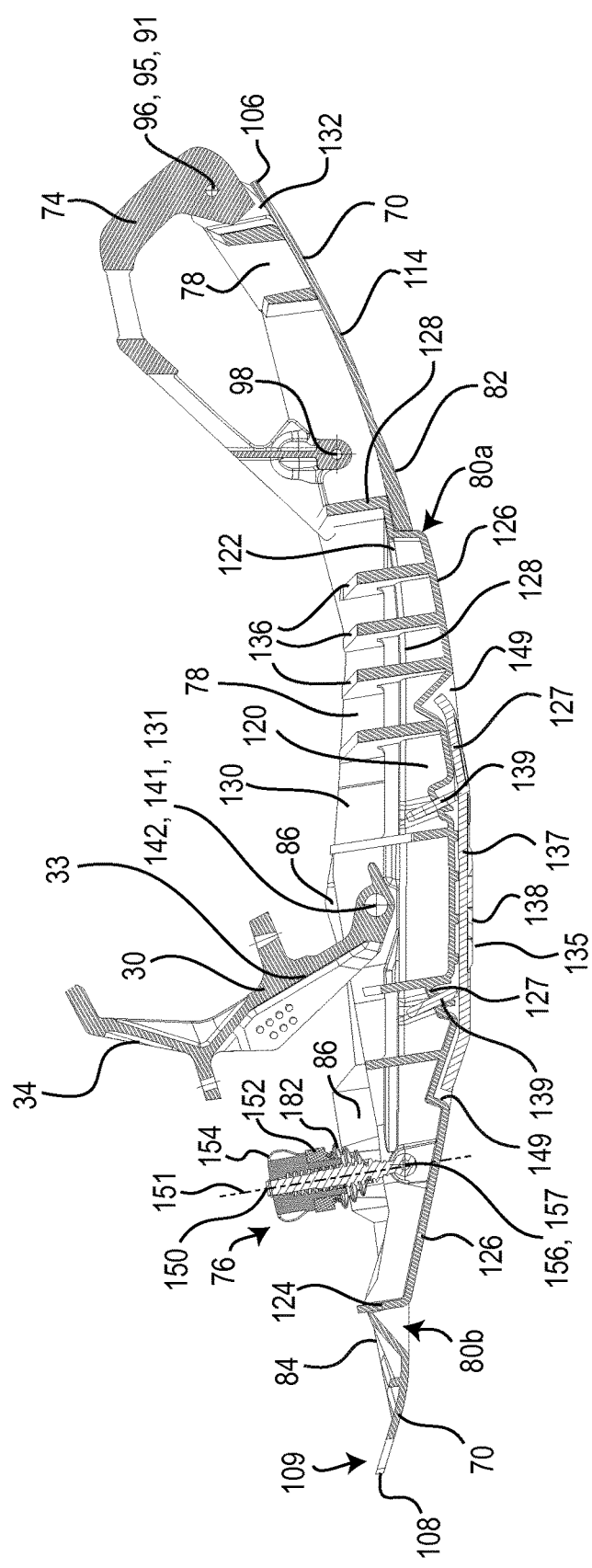
FIG. 6 is a cross-sectional view of the ski assembly of FIG. 2, taken along the line A-A of FIG. 5.
Figure 8:
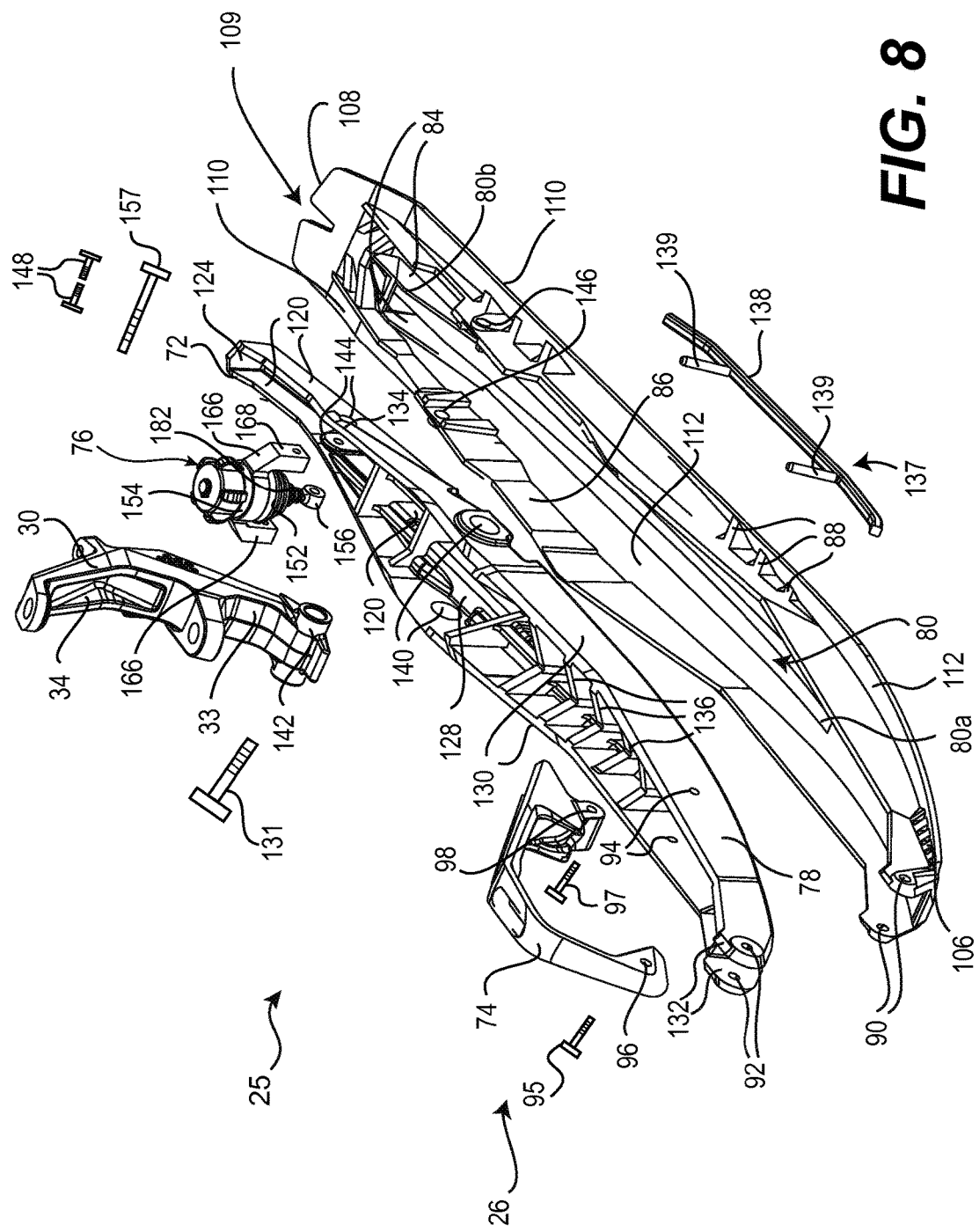
FIG. 8 is an exploded perspective view, taken from a top, front and left side, of the ski assembly of FIG. 2.

With reference to FIGS. 6 and 8, a longitudinal slot 80 extends through the ski body 70 from the upper surface 112 to the lower surface 114. The longitudinal slot 80 is disposed along the longitudinal centerline 27. The slot 80 is thus laterally centered in the ski body 70 and has a uniform width in the lateral direction. It is contemplated that the slot 80 could not be laterally centered in the ski body 70. It is contemplated that the width of the slot 80 could not be uniform. The rear end 80b of the slot 80 is disposed in the rear portion 104 spaced from the rear end 108 of the ski body 70. The front end 80a of the slot 80 is disposed just rearward of the upturned front portion 100. The slot 80 thus extends from the rear portion 104 through the middle portion 102. The slot 80 could extend more or less, in either the longitudinal or the lateral direction, than as shown in the illustrated implementation. It is contemplated that the slot 80 could extend all the way to the rear end 108 of the ski body 70 and/or the front end 106 of the ski body 70. It is also contemplated that the slot 80 could extend to one of the lateral edges 110 of the ski body 70.

The ski body 70 has left and right side portions 86 extending upwards from the upper surface 80 on the left and right sides, respectively, of the slot 80. The side portions 86 extend from the front end 106 of the ski body 70 to the rear portion 104 just forward of the rear end 106 of the ski body 70. The side portions 86 are disposed laterally outwards of the slot 80 and laterally inwards of the lateral edges 110. It is contemplated that the side portions 86 could be disposed along the lateral edges 110, and that they could extend more or less in the longitudinal direction than as shown in the illustrated implementation. The side portions 86 serve to deflect snow away from the ski leg 30 and keel 72 and also provide structural reinforcement to the ski body 70. The side portions 86 have a greater height above the upper surface 112 in the middle portion 102, where the ski leg is connected to the keel 72, than in the front and rear portions 100, 104.

Ribs 88, extending laterally outwards from the outer surface of the side portions 86 to the upper surface 80, provide structural reinforcement to the side portions 86. It is contemplated that the ski body 70 could have ribs 88 extending laterally inwards from the side portions 86. It is also contemplated that the ribs 88 could be omitted.

The ski body 70 also has walls 84 extending upwards from the upper surface 112 adjacent to the slot 80 in the rear portion 104. The walls 84 extend around the rear end 80b of the slot 80 to prevent entry of snow, ice dirt, etc. therethrough when the rear portion 104 of the ski body 70 is lowered with respect to the keel 72 as will be discussed below.

Figure 4:
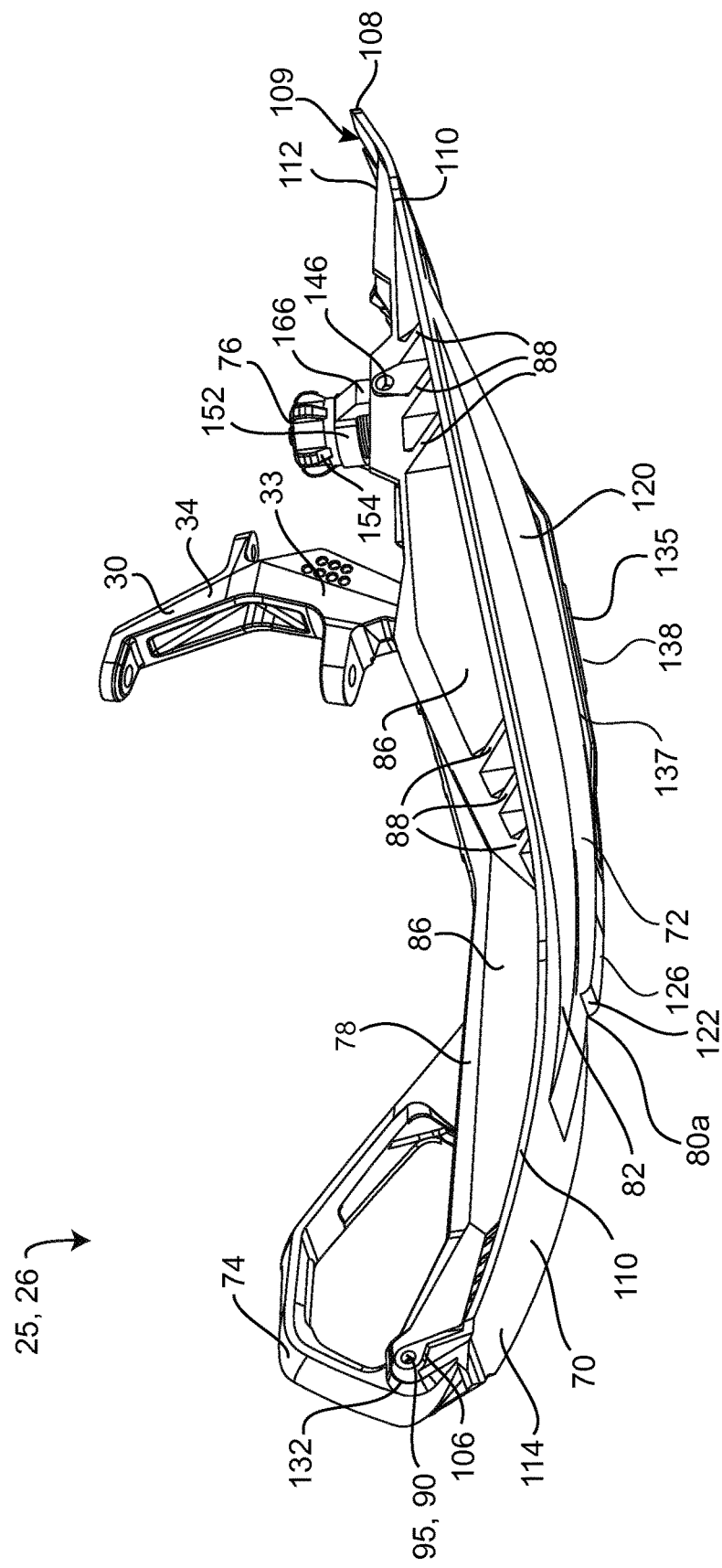
FIG. 4 is a perspective view, taken from a bottom, left side, of the ski assembly of FIG. 2.
Figure 10:
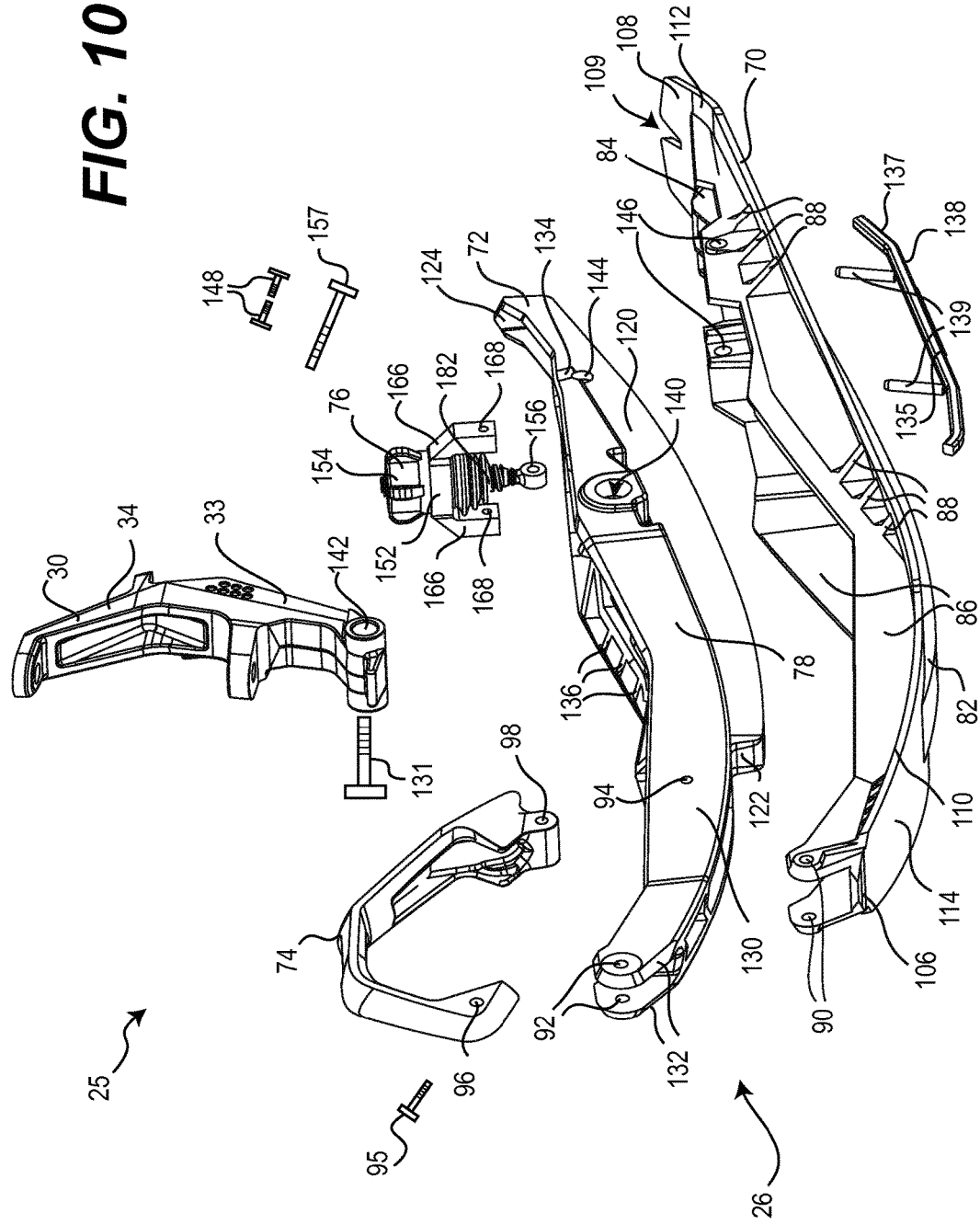
FIG. 10 is an exploded perspective view, taken from a bottom, front and left side, of the ski assembly of FIG. 2.

With reference to FIGS. 4, 7 and 10, a longitudinal protrusion 82 extends downwards from the lower surface 114 of the ski body 70. The height of the protrusion 82 below the lower surface 114 is greatest in the middle portion 102. The height of the protrusion decreases as it extends from the middle portion 102 towards the front and rear ends 106, 108. The protrusion 82 is laterally centered, and laterally wider than the slot 80. The slot 80 extends through the protrusion 82. As can be seen best in FIG. 7, the rear end 80b of the slot 80 extends further rearward than the rear end of the protrusion 82. In the front portion 100, the front end of protrusion 82 extends further forward than the front end 80a of the slot 80 as can be seen in FIGS. 4 and 7. The protrusion 82 serves as a secondary keel for the ski body 70 and aids in steering of the skis 26, and the snowmobile 10. The protrusion 82 provides some steering ability even when the keel 72 is completely retracted into the slot 80 as will be explained below. It is contemplated that the protrusion 82 could be omitted.

Figure 9:
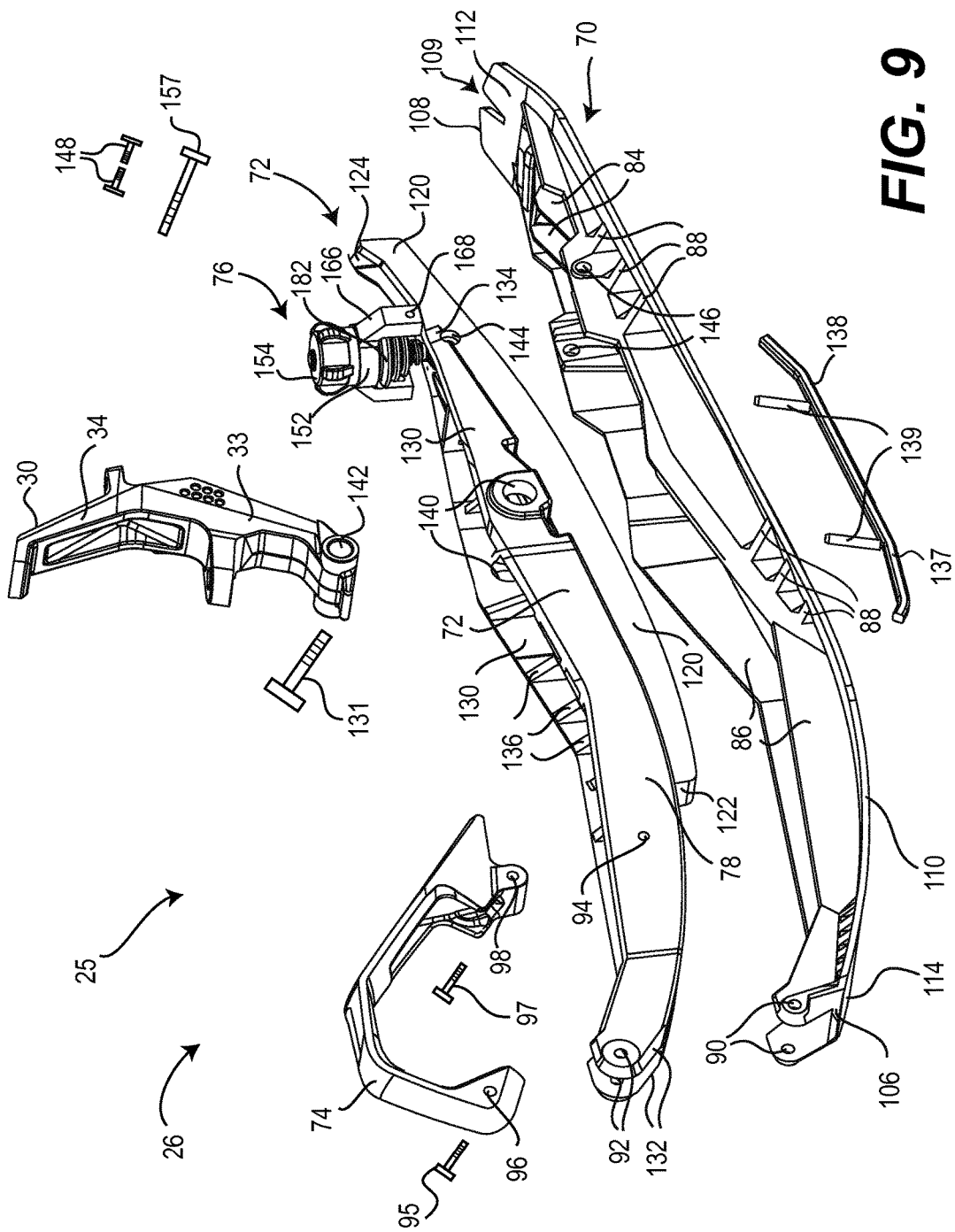
FIG. 9 is an exploded perspective view, taken from a front, left side, of the ski assembly of FIG. 2.

With reference to FIGS. 8 to 10, a hole 90 extends through the front end 106 of each side portion 86. The holes 90 are used to fasten together the ski body 70, the mounting bracket 78 and the handle 74 as explained below. A hole 146 extends through each of the side portions 86 in the rear portion of the ski body 70. The holes 146 are used to retain the ski body 70 to the ski adjuster 76 as will be explained below.

Figure 11C:
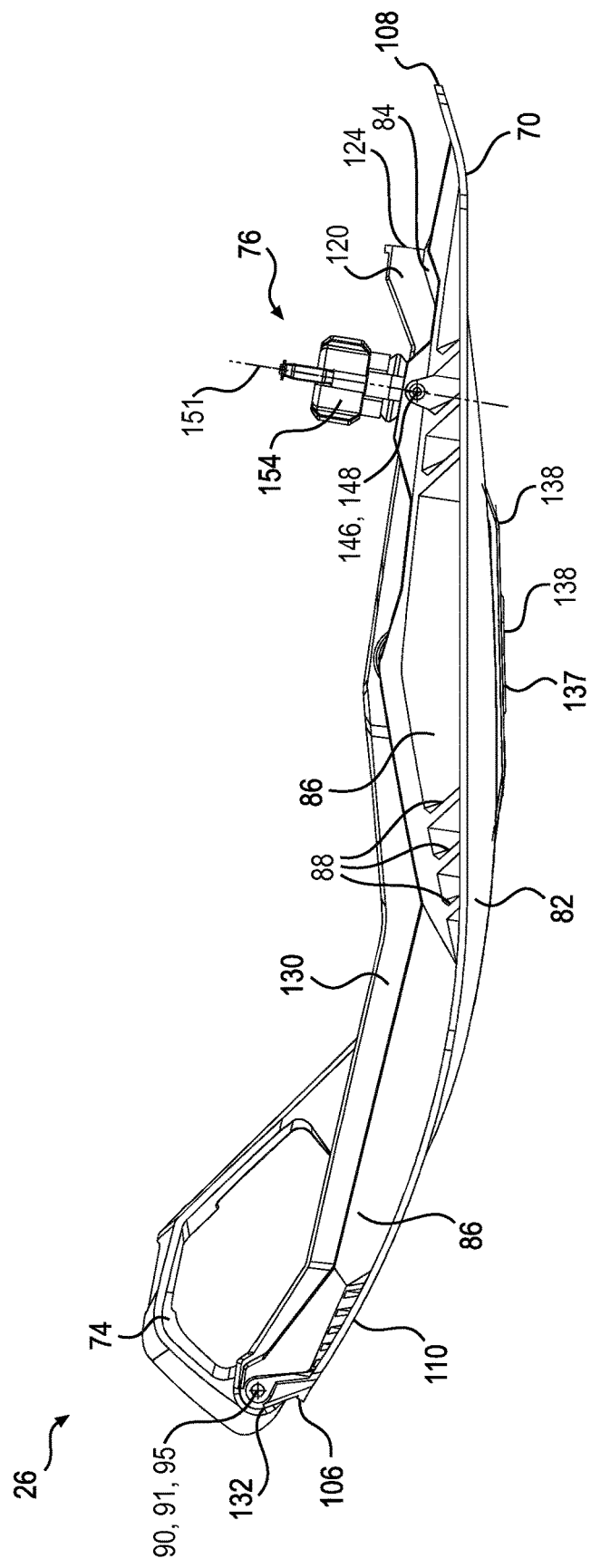

The keel 72 has a hollow and rectangular structure. The keel 72 has a keel base 126 disposed in the slot 80 when the ski body 70 is lowered with respect to the keel 72 (as seen in FIGS. 4 and 11C). The keel base 126 extends below the slot 80 and below the protrusions 82 when the ski body 70 is raised (as seen in FIGS. 11A and 11B). A pair of parallel left and right side walls 120, a front wall 122, and a rear wall 124 extend upwards from the keel base 126. The front wall 122, extending just rearward of the front end of the slot 80, connects between the front ends of the longitudinally extending side walls 120. The rear wall 124, extending just forward of the rear end of the slot 80, connects between the rear ends of the left and right side walls 120.

A wall 128 (seen in FIGS. 5 and 8) extends horizontally and laterally outwards from the top surface of the left and right keel walls 120 to support the mounting bracket 78 thereabove.

The mounting bracket 78 extends upwards from the keel 72. In the illustrated implementation, the mounting bracket 78 is formed integrally with the keel 72, but it is contemplated that the mounting bracket 78 could be formed as a separate element that is rigidly attached to the keel 72.

The mounting bracket 78 has a left wall 130 and a right wall 130 extending upwards from the horizontally extending wall 128 of the keel 72. The left and right mounting bracket walls 130 are therefore each disposed laterally outwards of the respective left and right keel walls 120. The left and right mounting bracket walls 130 are each disposed laterally inwards of the respective left and right side portions 86 of the ski body 70 as can be seen in FIG. 5. The portion of the mounting bracket walls 130 disposed forwardly of the ski leg 30 abuts the respective side portions 86. The mounting bracket walls 120 converge towards the keel walls 120 rearwards of the ski leg 30.

Each mounting bracket wall 130 has a front end 132 and a rear end 134. With reference to FIGS. 9 and 10, the front end 132 of the mounting bracket 78 is disposed forward of the front keel wall 122 and aligned with the front end 106 of the ski body 70. The rear end 134 of the mounting bracket 78 is disposed forward of the rear keel wall 124. In the front, the mounting bracket walls 130 curve upwardly from the front keel wall 122 to the front end 132. In the rear portion, the left and right side walls 130 of the mounting bracket 78 slope downwards to the rear end 134 and the upper surface of the keel walls 120.

A plurality of ribs 136 extends laterally between the left and right walls 130 of the mounting bracket 78 as best seen in FIGS. 5 and 8. The lower portion of the ribs 136 extend between the left and right keel walls 120. The ribs 136 provide structural support and stability to the keel 72 and mounting bracket 78. It is contemplated that the ribs 136 could be formed as two separate sets of ribs, a first set of ribs connecting the mounting bracket walls 130 and a second set of ribs connecting the keel walls 120.

The ski leg 30 is pivotably connected to the middle portion of the mounting bracket 78 and extends upwards therefrom. A hole 140 extends through each of the left and right mounting bracket walls 130 for connection of the ski leg 30 which has a corresponding hole 142 extending through its lower end. The ski leg is placed between the walls 130 of the mounting bracket and a bolt 131 is inserted through the aligned holes 140, 142 to pivotably connect the ski leg 30 to the ski 25. The center of the hole 140 of the mounting bracket 78 thus defines a pivot axis 141 (FIG. 5) of the ski leg 130. The ski leg 30 has a lower portion 33 extending upwards and rearwards from the mounting bracket 78, and an upper portion 34 extending upwards and forwards from the lower portion 33. It is contemplated that the ski leg 30 could have a different structure than as shown.

A hole 144 extends through the rear ends 134 of each mounting bracket wall 130 where the mounting bracket walls 130 slope downwards to the keel walls 120. The holes 144 are used to couple the keel 70 and mounting bracket 78 to the ski adjuster 76 as will be explained below.

A hole 92 extends through the front end 132 of each mounting bracket wall 130. The hole 92 is aligned with the hole 90 of the front end 106 of the ski body 72. Another hole 94 extends through each mounting bracket wall 130 rearward of the hole 92.

The inverted U-shaped handle 74 extends upwards from the forward portion of the mounting bracket 78. The handle is positioned in the front portion of the ski 26 where it can be easily accessed to lift the ski 25 and thereby lift and move the front 12 of the snowmobile 10. It is contemplated that the handle 74 could be disposed in a different location. The front and rear ends, respectively, of the handle 74 have a hole 96 and a hole 98 extending therethrough. The handle 74 is placed between the mounting bracket walls 130 so that the handle holes 96, 98 are aligned respectively with the holes 92, 94 of the mounting bracket 78.

Figure 2:
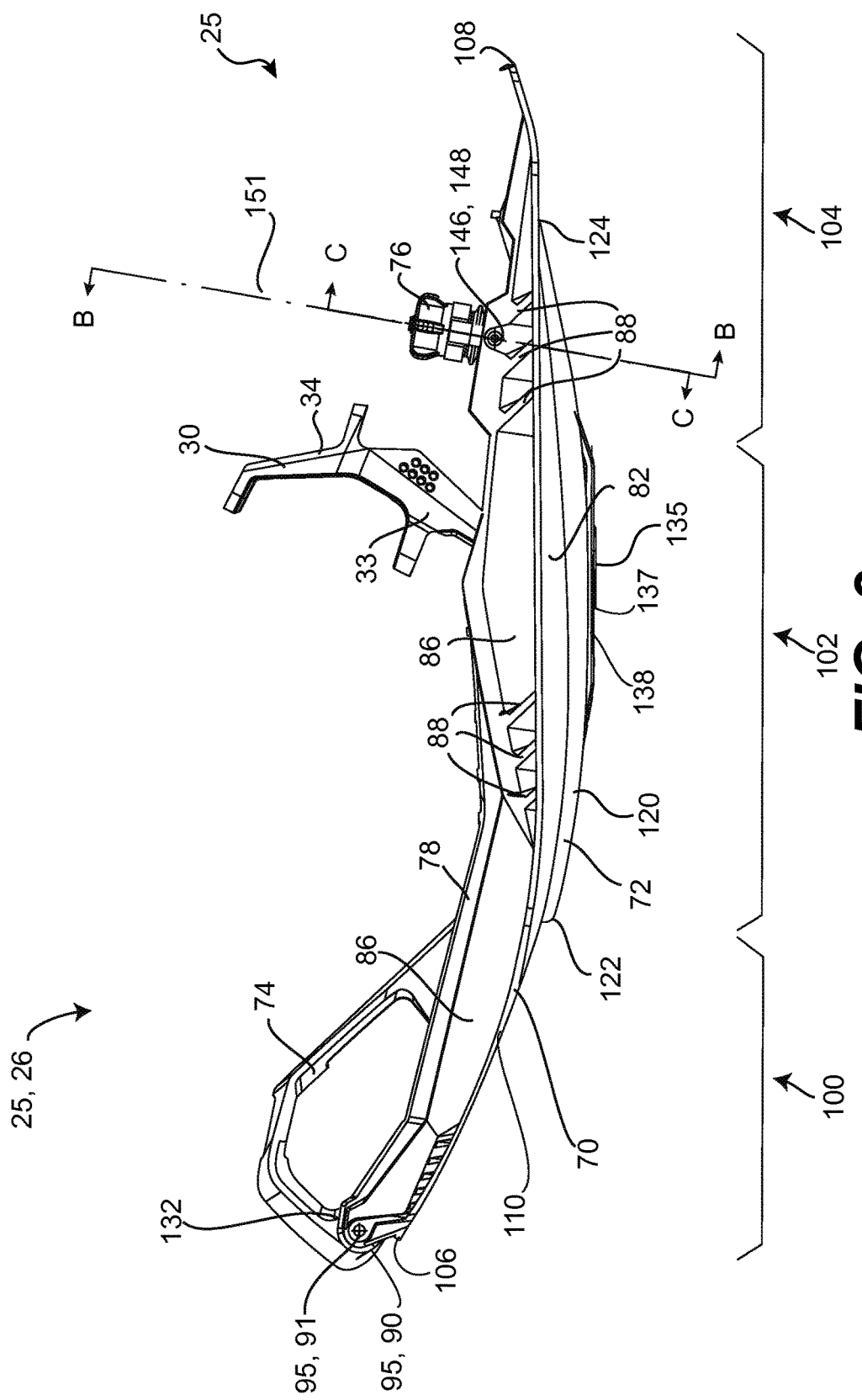
FIG. 2 is a left side elevation view of FIG. 1 of the ski and the ski leg of the left side ski assembly of the snowmobile of FIG. 1.
Figure 3:
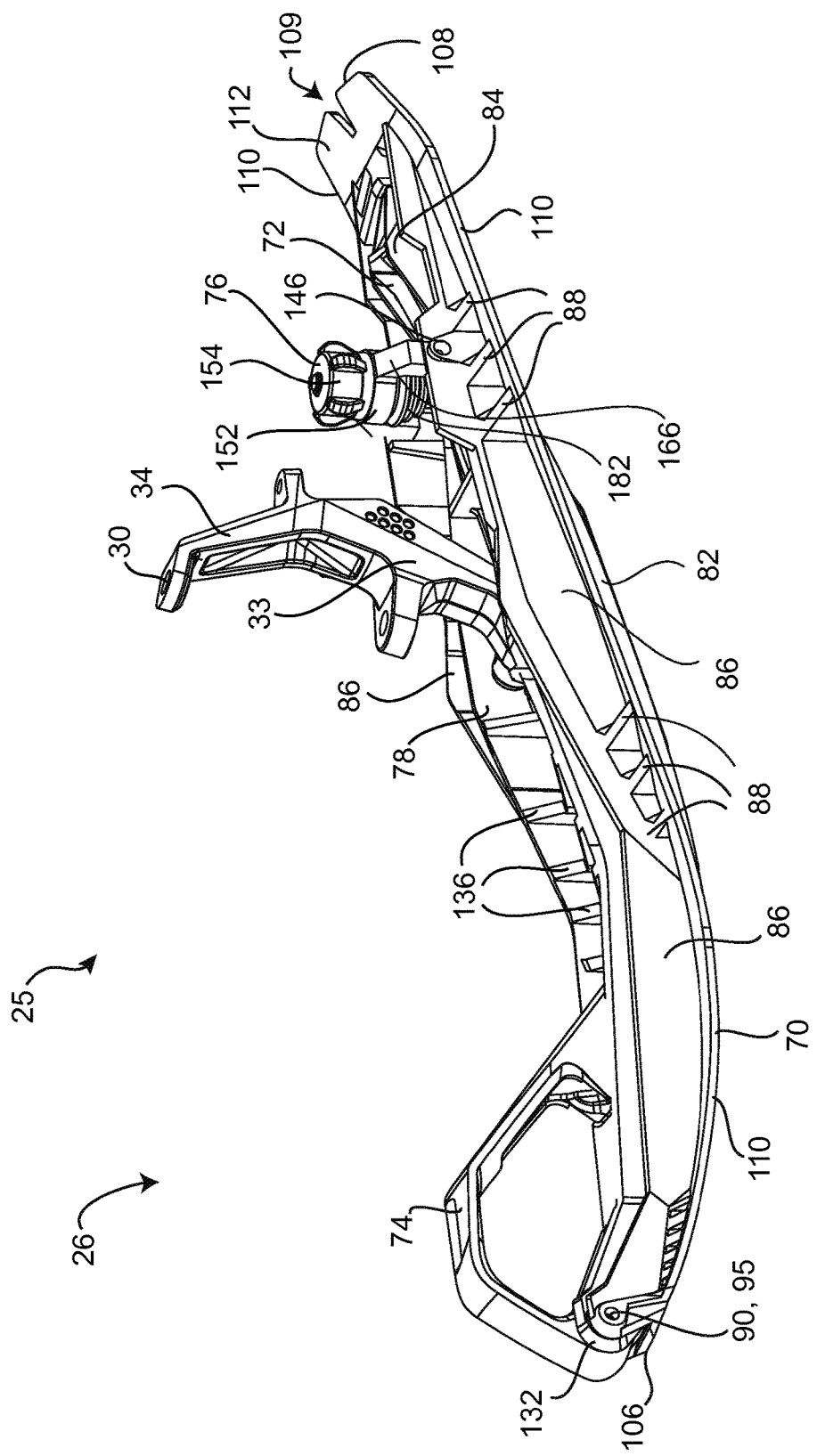
FIG. 3 is a perspective view, taken from a top, left side, of the ski assembly of FIG. 2.

The front ends of the handle 74, the mounting bracket 78, and the ski body 70 are bolted together by bolt 95, as can been in FIGS. 2 to 4, via their respective holes 90, 92, 96. The ski body 70 and the mounting bracket 78 are pivotable with respect to each other, about a pivot axis 91 defined by the centers of the hole 90, 92. The rear end of the handle 74 is fastened to mounting bracket 78 via the aligned holes 94, 98. The handle 74 is thus attached rigidly to the mounting bracket 78.

It is contemplated that the holes 96 of the handle 74 could not be aligned with the holes 90, 92, and that the handle 74 could be connected to the mounting bracket 78 and/or ski body 70 elsewhere. It is also contemplated that the holes 90, 92 and the connection of the ski body 70 to mounting bracket 78 could be formed elsewhere along the ski body 70, for example at the rear end 108.

It is contemplated that the handle 74 could have a different shape than as shown. It is contemplated that the handle 74 could be formed integrally with the mounting bracket 78, the keel 72 or the ski body 70. It is contemplated that there could be more than one handle 74, or that the handle 74 could be omitted.

A skag 137 is fastened to the undersurface of the keel base 126. The skag 137 is made of steel and prevents wear and damage of the undersurface of the keel 72. A carbide piece 135 is affixed to the lower side of the skag 137 to prevent the skag 137 from wear when traveling over hard ground. The skag 137 is in the form of longitudinal rod 138 with two mounting studs 139 extending upwards therefrom. The mounting studs 139 extend at an angle with respect to the longitudinal rod 138. It is however contemplated that the mounting studs 139 could be perpendicular to the longitudinal rod 138. With reference to FIG. 6, the mounting studs 139 are inserted through openings 127 of the bottom keel wall 126 to be retained to the keel 72. The ends of the mounting studs 139 are threaded and a nut (not shown) is placed around the threaded ends to retain the skag 137 to the keel 72. The front and rear ends of the longitudinal mounting studs 138 are angled upwards. The ends of the mounting studs 138 are accommodated in recesses 149 extending into the undersurface of the keel base 126 to prevent the skag 137 from being inadvertently knocked out of the ski 26 by bumps on the surface being traversed by the snowmobile 10. It is contemplated that the skag 137 could have more than two vertical mounting studs 139, with a corresponding number of openings 127 formed in the keel base 126 to receive the mounting studs 139. It is also contemplated that more than one skag 137 could be connected to the keel base 126.

The ski body 70 can be moved down/up relative to the keel 72 so that the keel base 126 extends in/below the slot 80 as shown in FIGS. 11A to 11C. The ski adjustor 76 is used to adjust the position of the ski body 70 relative to the keel 70.

The ski adjuster 76 will now be described with reference to FIGS. 11 to 16. The ski adjustor 76 includes an adjustment screw 150, a retainer 152, and an adjustment knob 154.

Figure 12:
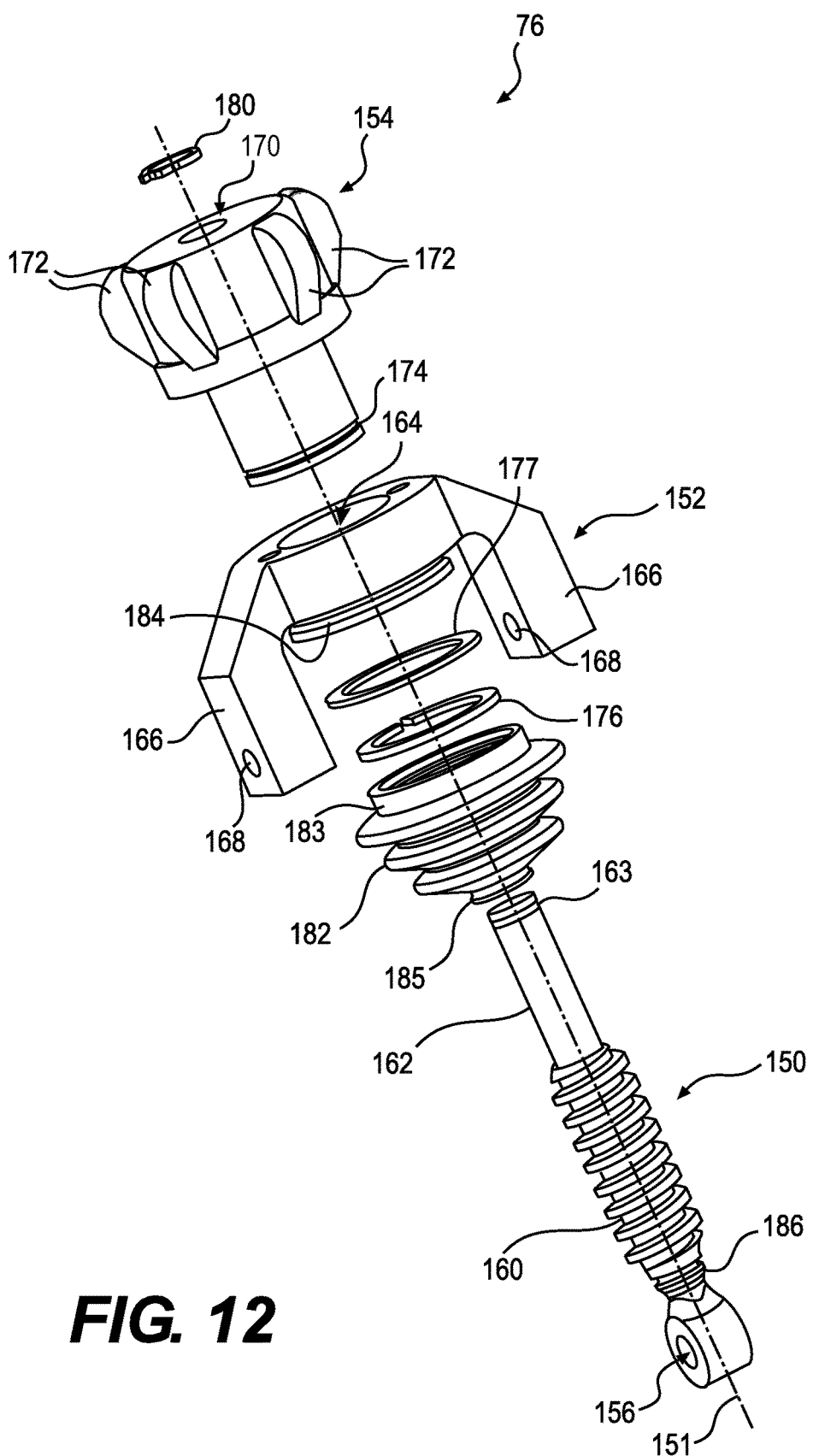
FIG. 12 is an exploded perspective view, taken from a front, right side, of the ski adjuster of the ski assembly of FIG. 2.
Figure 13A:
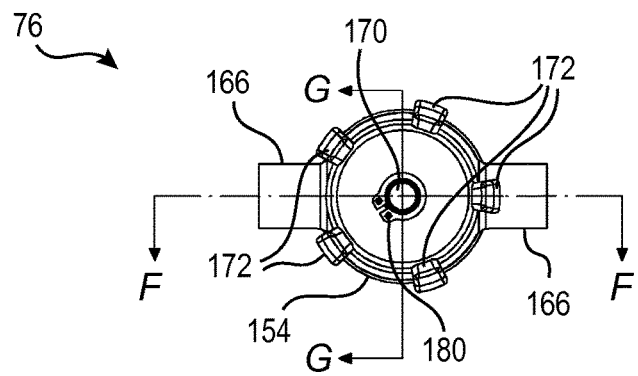
FIG. 13A is a top plan view of the ski adjuster of FIG. 12.
Figure 13B:
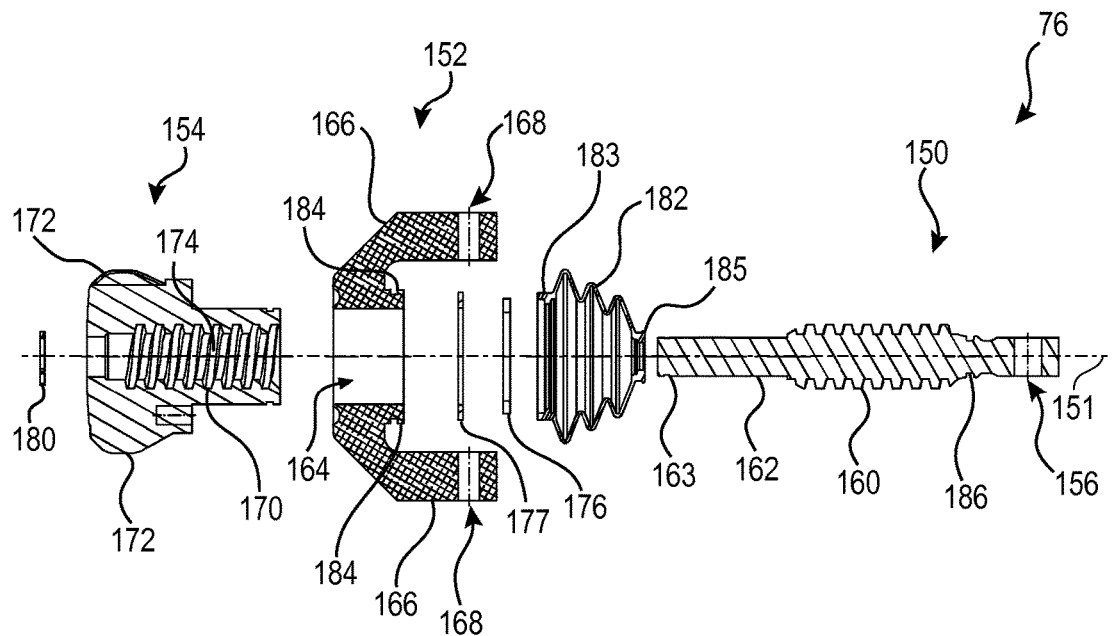
FIG. 13B is a cross-sectional view of the ski adjuster of FIG. 13A, taken along the line F-F of FIG. 13A.
Figure 13C:
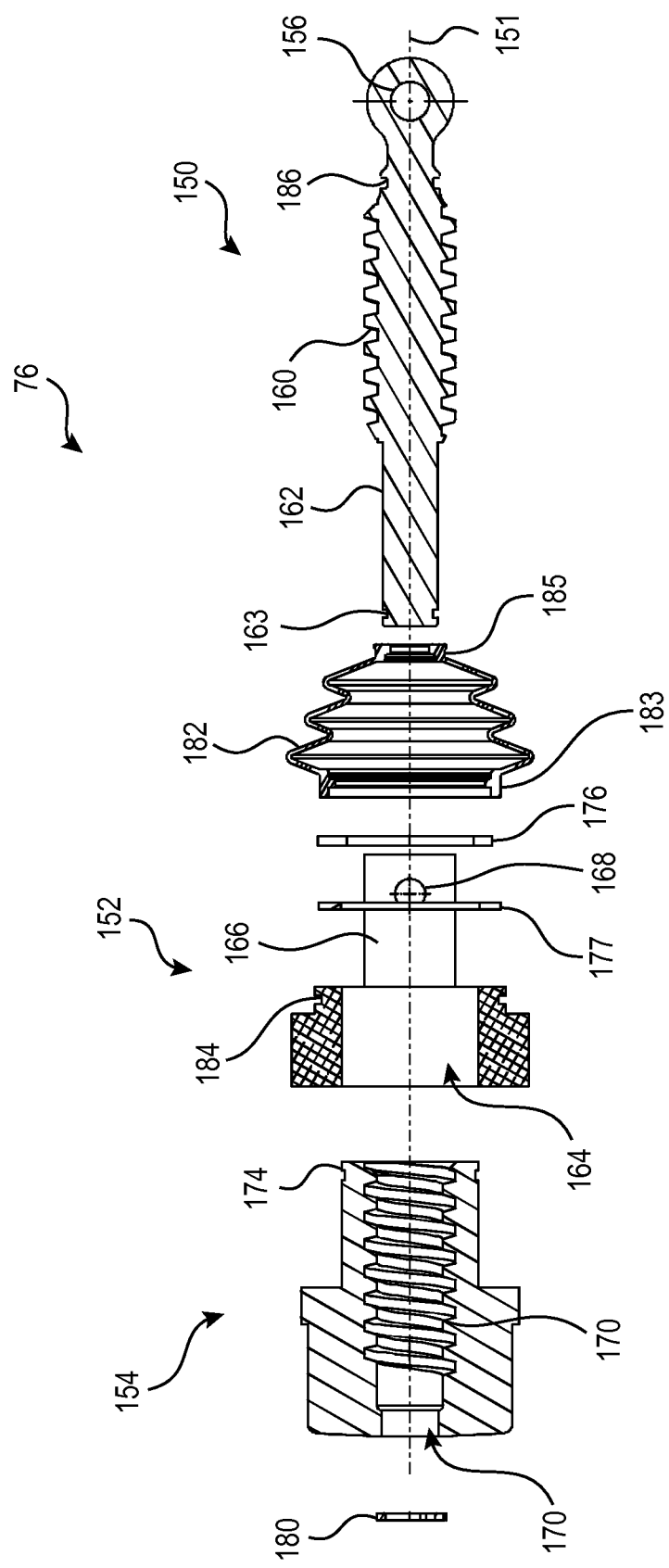
FIG. 13C is a cross-sectional view of the ski adjuster of FIG. 13A, taken along the line G-G of FIG. 13A.
Figure 14:
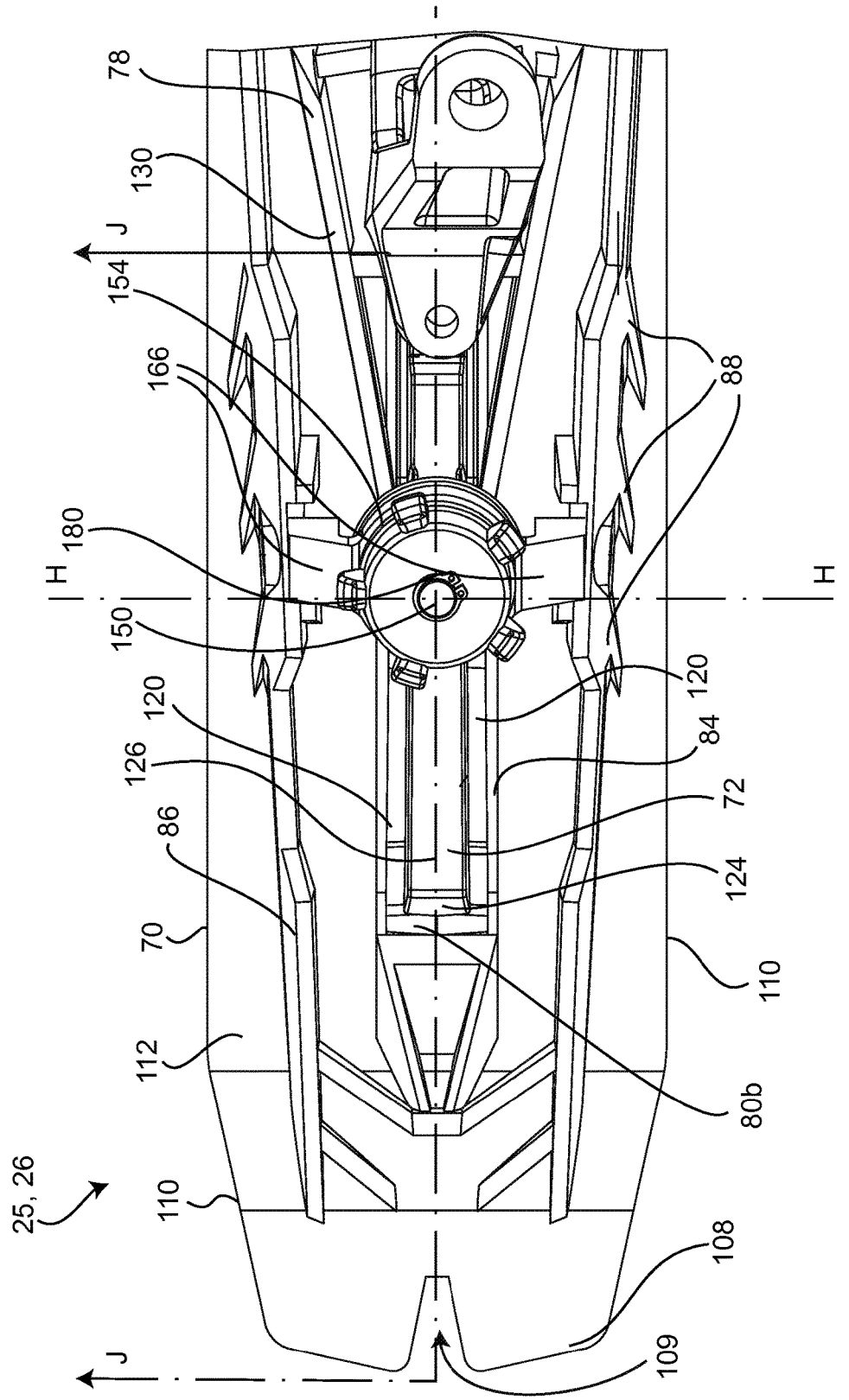
FIG. 14 is an top plan view of a rear portion of the ski of FIG. 2 showing the ski adjustor.

With reference to FIGS. 12 to 13C, the adjustment screw 150 has a shaft with a threaded lower portion 160 and a smooth and unthreaded upper portion 162. The lower end of the adjustment screw 150 has a through-hole 156. An annular groove 163 is defined in the upper end of the adjustment screw 150. Another annular groove 186 is also defined in the shaft between the threaded portion 160 and the through-hole 156.

The retainer 152 is an annular cylinder with a central opening 164 extending therethrough. Two flanges 166 extend outward and downward from the opposite sides of the outer cylindrical surface of the retainer 152. Each flange 166 has an opening 168 defined through its lower end.

The adjustment knob 154 is an annular cylindrical structure with a central opening 170 extending therethrough. The inner surface of the opening 170 is threaded and complementary to the threaded portion 160 of the adjustment screw 150. The outer diameter of the upper portion of the cylindrical adjustment knob 154 is larger than that of the lower portion. Five circumferentially distributed tabs 172 extend radially outwards from the upper portion of the outer cylindrical surface to facilitate turning of the adjustment knob 154 by hand. A groove 174 is defined in the outer cylindrical surface of the lower portion of the adjustment knob 154. The adjustment knob 154 is made of nylon but it is contemplated that they could be made of other suitable materials. The retainer 152 is made of aluminum but it is contemplated that they could be made of other suitable materials.

With reference to FIGS. 14 to 16B, the lower portion of the adjustment knob 154 is inserted into the central opening 164 of the retainer 152 disposed below the adjustment knob 154. The upper portion of the adjustment knob 154 remains above of the retainer 152 while the lower end with the groove 174 extends below the retainer 152. A washer 177 is disposed above a circlip 176 which is inserted in the groove 174 of the lower end extending below the retainer 152. The lower portion of the adjustment knob 154 is thus retained within the central opening 164 with the upper portion and its tabs 172 disposed thereabove to facilitate rotation of the knob 154.

The adjustment screw 150 is inserted through the adjustment knob 154 so that the threaded portion 160 engages the threaded inner surface 170. The upper end of the adjustment screw 150 extends upwards out of the upper end of the adjustment knob 154. The circlip 180 engages the groove 163 of the upper end of the adjustment screw 150, thereby preventing the groove 163 from descending into the adjustment knob 154, and thus limiting the downward motion of the adjustment screw 150 in the adjustment knob 154.

The lower end of the adjustment screw is disposed between the keel walls 120 at the rear end 134 of the mounting bracket 78 so that the opening 156 is aligned with the holes 144 of the keel walls 120 and the mounting bracket walls 130. A bolt 157 is inserted through openings 156 of the adjustment screw 150 and the holes 144 of the mounting bracket walls 130 (and keel walls 120) to couple the adjustment screw 150, and thereby the ski adjustor 76 to the keel 70 and mounting bracket 78. The adjustment screw 150 is pivotable with respect to the keel walls 120.

The retainer flanges 166 are fastened to the inward facing surfaces of the side portions 86 of the ski body 70. The left flange 166 is fastened to the left side portion 86 of the ski body 70 by a left bolt 148 inserted through their respective holes, 168 and 146. Similarly, the right flange 166 is fastened to the right side portion 86 of the ski body 70 by a right bolt 148 inserted through their respective holes, 168 and 146. The flanges 166 are pivotable with respect to the side portions 86. It is contemplated that the flanges 166 could be placed over the side portions 86 such that the inner surface of the flanges 166 abuts the outer surface of the side portion 86 and fastened thereto. In this case, the ribs 136 on the outer surface of the side portions 86 could be omitted where the flanges 166 are fastened, or the flanges 166 could be placed so as to avoid the ribs 88.

The ski adjuster 76 also includes flexible bellows 182 which are placed around the lower portion of the adjustment screw 150 extending below the retainer 152. The bellows 182 protect the threaded portion of the adjustment screw 150 from snow, ice, dirt, and the like. It is contemplated that the bellows 182 could be omitted. An upper end 183 of the bellows 182 is retained in an annular groove 184 defined in the lower end of the outer cylindrical surface of the retainer 152. A lower end of the bellows 185 is retained in an annular groove 186 defined in the adjustment screw 150 between the threaded portion 160 and the opening 156. The diameter of the bellows 182 decreases from the upper end 183 to the lower end 185. It is contemplated that the diameter of the bellows could also be uniform.

When the adjustment knob 154 is turned, its threaded inner cylindrical surface 170 retracts upwards or advances downwards along the threaded portion 160 of the adjustment screw 150, thereby moving the retainer 152, fixed to the adjustment knob 154, upwards or downwards relative to the lower end 156 of adjustment screw 150. The ski body 70, fixed to the retainer 152, thus moves upwards or downwards with respect to the keel 72, mounting bracket 78, and ski leg 30, which are connected to the lower end of the adjustment screw 150.

FIGS. 11A, 11B and 11C, show the ski body 70 disposed in three different positions relative to the keel 72, mounting bracket 78, and the ski leg 30 (omitted from the figures for clarity). In the position of FIG. 11A, the ski body 70 is disposed in a higher position, relative to keel 72, mounting bracket 78, and the ski leg 30, than in the positions of FIGS. 11B and 11C. The keel 72 is therefore extending further below the ski body 70 in the position of FIG. 11A than in the positions of FIGS. 11B and 11C.

Figure 15B:
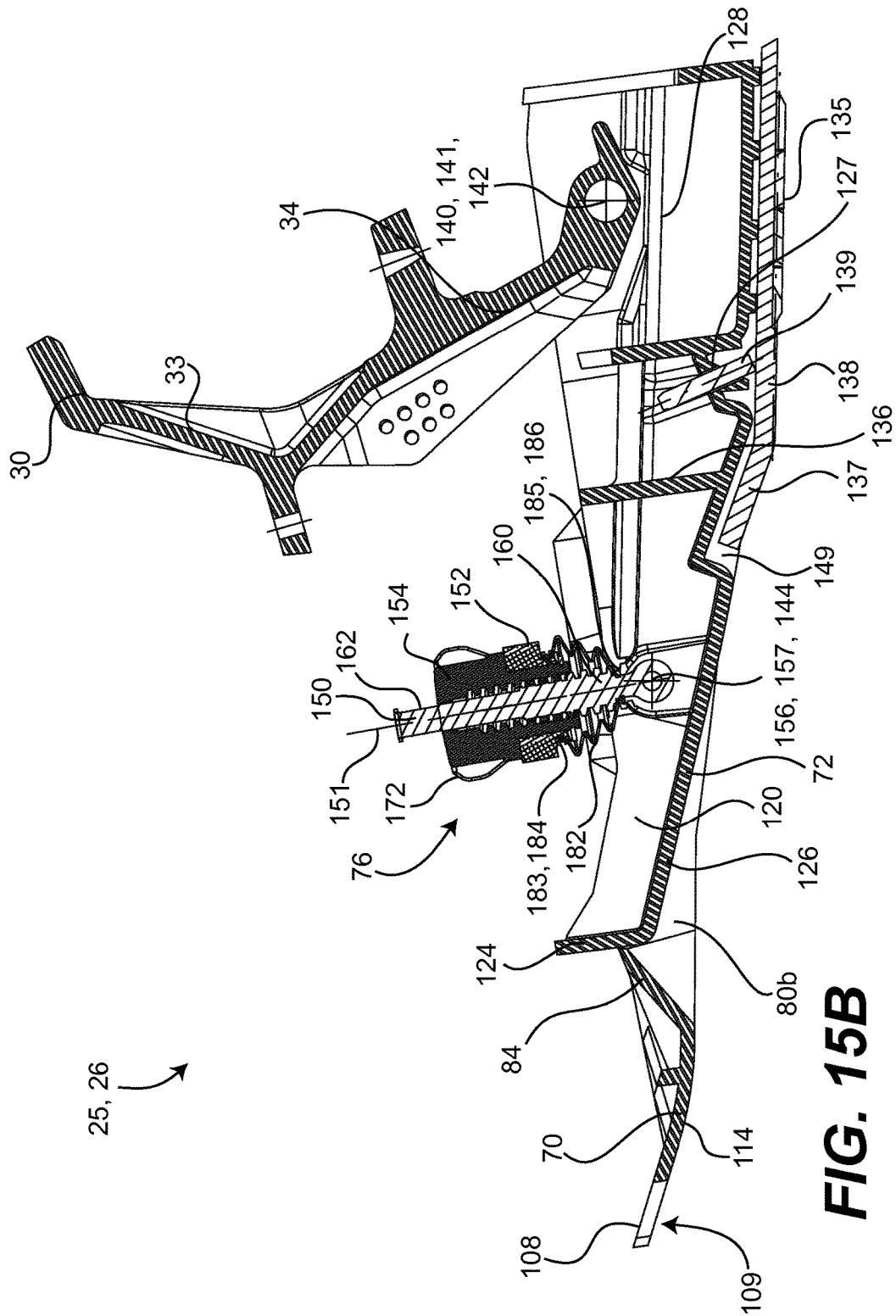
FIG. 15B is an enlarged cross-sectional view of the rear portion of the ski of FIG. 14, taken along the line J-J of FIG. 14, with the ski body in the position shown in FIG. 11C.
Figure 16A:
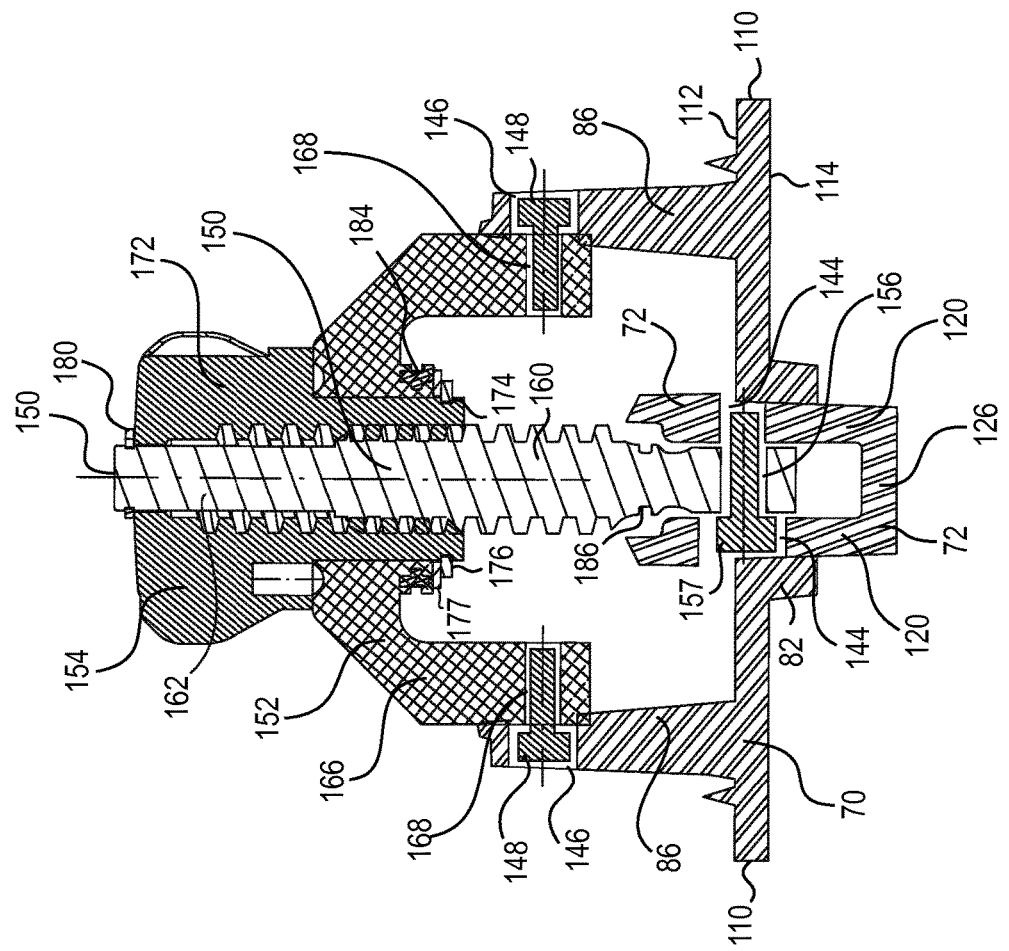
FIG. 16A is a cross-sectional view of the ski, taken along the line H-H of FIG. 14, with the ski body in the position shown in FIG. 11A and the bellows removed for clarity.

In FIGS. 11A, 15A and 16A, the adjustment knob 154 is retracted to its highest position along the adjustment screw 150, so that the lower surface 114 of the ski body 70 is higher than the keel base 126. The circlip 180 limits further retraction of the adjustment knob 154, and thereby limits the upward displacement the ski body 70 relative to the keel 72 and mounting bracket 78. In this configuration, the upper surface 112 of the ski body 72 abuts the undersurface of the horizontal wall 128 of the keel 72.

Figure 16B:
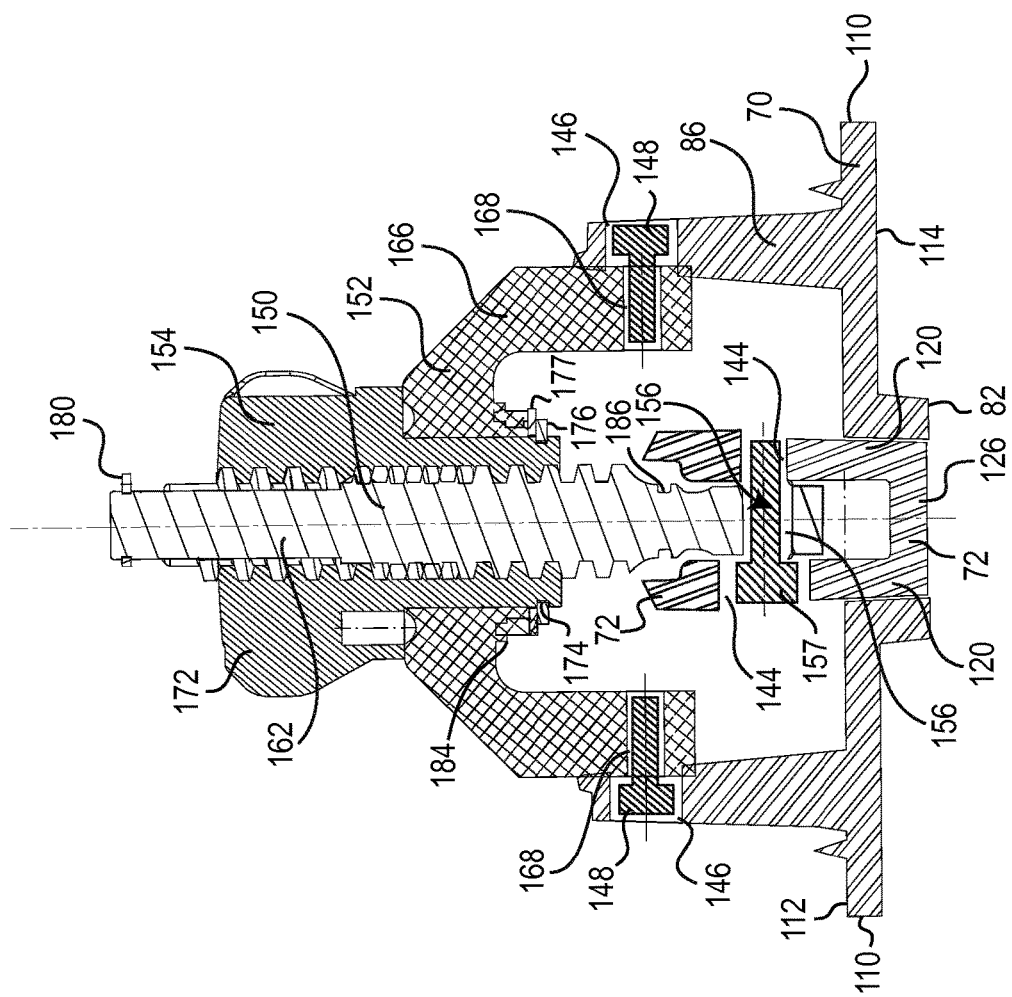
FIG. 16B is a cross-sectional view of the ski, taken along the line H-H of FIG. 14, with the ski body in the position shown in FIG. 11C and the bellows removed for clarity.

In FIGS. 11C, 15B and 16B, the adjustment knob 154 is advanced to its lowest position along the adjustment screw 150. The upper end of the adjustment screw 150 extends above the adjustment knob 154 and the circlip 180 is not in contact with the upper surface of the adjustment knob 154. In this position, the lower surface 114 of the ski body 70 is moved upwards closer to the keel base 126 in FIG. 11A etc. It is contemplated that the lower surface 114 could be disposed lower than the keel base 126 in this position.

It should be understood that moving the ski body 70 upwards or downwards relative to the keel 72 implies pivoting of the ski body 70, with respect to the keel 72, about the pivot axis 91 in the front portion of the ski 26. Therefore, the up/down displacement of the front portion 100 of the ski body 72 relative to the front wall 122 of the keel 72 is less than that of the rear portion 104 of the ski body 70 relative to the rear end 124 of the keel 72.

The ski adjuster 76 and the side portions 86 of the ski body 70 are configured so as to minimise the longitudinal direction displacement of the bolt 157 received in the hole 156 of the adjustment screw 150 and the holes 144 of the keel walls 120. The central axis 151 of the adjustment screw 150, or screw axis 151, is tangential to a circle centered about the pivot axis 91 and intersecting the line 147 passing through the holes 146, 168 (FIGS. 16A, 16B) in order to longitudinal direction movement of the bolt 157 in the openings 144, 156 as the ski body 70 pivots about the pivot axis 91.

It is contemplated that the ski adjuster 76 could be disposed in a different location on the ski 26. It is contemplated that the ski body 70 could be adjustably coupled to the keel 72 by means of two ski adjustors 76. For example, a first ski adjustor could couple the front portions and a second ski adjuster could couple the rear portions to enable independent adjustment of the front and rear portions of the ski body 70 relative to the keel 72.

It is contemplated that the ski adjuster 76 could be configured differently than as shown. For example, the retainer 152 could be omitted and the screw 150 could engage threads formed in a portion of the ski body 70. As another example, the screw 150 could be fixed to the knob 154 and engage threads defined in a portion of the keel 72 and/or mounting bracket 78.

It is also contemplated that ski adjuster 76 and the ski assembly 25 could be configured only to retain the ski body 70 in different positions with respect to the keel 72, mounting bracket 78 and/or the ski leg 30. For example, the ski adjuster 76 could consist of various holes disposed at different points along the ski body 70, the keel 72 and/or mounting bracket 78 corresponding to different positions of the ski body 70, and bolts or quick-release pins by which the ski body could be thereby fastened to the keel 72 and/or mounting bracket 78 after manually moving the ski body 70 to the appropriate position.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A ski for a snowmobile comprising:
    a longitudinal ski body having an upper surface and a lower snow-contacting surface;
    a longitudinal slot in the ski body extending from the upper surface to the lower surface;
    a longitudinal keel adapted to connect pivotably to a ski leg of the snowmobile and to connect the ski body to the ski leg, at least a portion of the keel selectively extending in the slot;
    the ski body being connected to the keel,
        at least a portion of the ski body being selectively pivotable with respect to the keel about a fixed ski body pivot axis,
        the ski body being thereby selectively disposed in any one of a plurality of ski body positions, each of the plurality of ski body positions being defined at least by a position of the slot with respect to the keel; and
    a fastener retaining the ski body in any one of the ski body positions.

2. The ski of claim 1, wherein:
    the ski body pivot axis extends through a forward portion of the ski body; and
    the at least one portion of the ski body selectively moveable with respect to the keel comprises a rear portion of the ski body.

3. The ski of claim 1, further comprising a ski adjuster to pivot the at least one portion of the ski body to selectively dispose the ski body in any one of a plurality of ski body positions, the ski adjuster being coupled to the ski body and the keel.

4. The ski of claim 3, wherein the ski adjuster is connected to a rearward portion of the ski body.

5. The ski of claim 3, wherein:
    the ski adjuster comprises an adjustment screw engaging a plurality of threads defined in one of the ski adjuster, the keel, and the ski body; and
    advancing or retracting the adjustment screw along the plurality of threads moves the ski body with respect to the keel to thereby selectively pivot the at least one portion of the ski body from one of the plurality of ski body positions to another of the plurality of ski body positions.

6. The ski of claim 5, wherein:
    a ski leg pivot axis is defined by the keel; and
    the ski leg pivot axis is located longitudinally between the ski body pivot axis and the ski adjuster.

7. The ski of claim 6, further comprising a handle extending upwards from the keel; and
    wherein the ski body pivot axis extends through the ski body, the handle, and the keel.

8. The ski of claim 1, wherein the ski body further comprises at least one side portion extending upwards from the upper surface of the ski body, each of the at least one side portion is adapted for extending on one of a left side and a right side of the keel.

9. The ski of claim 1, wherein a forward portion of the ski body curves upwardly.

10. The ski of claim 1, wherein a forward portion of the keel curves upwardly.

11. The ski of claim 1, further comprising a ski leg mounting bracket for connecting the keel to the ski leg, wherein:
    the ski leg mounting bracket extends above the keel;
    the ski leg mounting bracket is rigidly connected to the keel, and the ski leg mounting bracket is adapted to pivotably connect to the ski leg.

12. The ski of claim 11, wherein a forward portion of the ski leg mounting bracket curves upwardly.

13. The ski of claim 11, wherein the ski body further comprises at least one side portion extending upwards above the upper surface of the ski body, each of the at least one side portion extending on one of a left side and a right side of the ski leg mounting bracket.

14. A snowmobile ski assembly comprising:
a longitudinal ski body having an upper surface and a lower snow-contacting surface;
a slot extending longitudinally in the ski body from the upper surface to the lower surface;
a longitudinal keel, a portion of the keel selectively extending below the slot;
a ski leg extending upwards from the keel and pivotably connected thereto,
the ski body being connected to the keel, the keel connecting the ski body to the ski leg, at least a portion of the ski body being selectively pivotable with respect to the keel about a fixed ski body pivot axis, the ski body being thereby selectively disposed in any one of a plurality of ski body positions, each of the plurality of ski body positions being defined at least by a position of the slot with respect to the keel; and
a fastener retaining the ski body in any one of the ski body positions.

15. A snowmobile comprising:
a frame;
an engine supported by the frame;
an endless track operatively connected to the engine; and
at least one ski assembly according to claim 14, wherein for each ski assembly, the ski leg is operatively connected to the frame.

16. A ski for a snowmobile comprising:
a longitudinal ski body having an upper surface and a lower snow-contacting surface;
a longitudinal slot in the ski body extending from the upper surface to the lower surface;
a longitudinal keel adapted to connect pivotably to a ski leg of the snowmobile, at least a portion of the keel selectively extending in the slot;
a ski leg mounting bracket formed integrally with the keel and extending above the keel, the ski leg mounting bracket adapted to pivotably connect to the ski leg;
the ski body being connected to the keel and being adapted thereby to connect to the ski leg,
at least a portion of the ski body being selectively pivotable with respect to the keel about a fixed ski body pivot axis,
the ski body being thereby selectively disposed in any one of a plurality of ski body positions, each of the plurality of ski body positions being defined at least by a position of the slot with respect to the keel; and
a fastener retaining the ski body in any one of the ski body positions.

17. The ski of claim 16, wherein:
the ski body pivot axis extends through a forward portion of the ski body; and
the at least one portion of the ski body selectively moveable with respect to the keel comprises a rear portion of the ski body.

18. The ski of claim 16, further comprising a ski adjuster to pivot the at least one portion of the ski body to selectively dispose the ski body in any one of a plurality of ski body positions, the ski adjuster being coupled to the ski body and the keel.

19. The ski of claim 18, wherein the ski adjuster is connected to a rearward portion of the ski body.

20. The ski of claim 18, wherein:
the ski adjuster comprises an adjustment screw engaging a plurality of threads defined in one of the ski adjuster, the keel, and the ski body; and
advancing or retracting the adjustment screw along the plurality of threads moves the ski body with respect to the keel to thereby selectively pivot the at least one portion of the ski body from one of the plurality of ski body positions to another of the plurality of ski body positions.

21. The ski of claim 20, wherein:
a ski leg pivot axis is defined by the keel; and
the ski leg pivot axis is located longitudinally between the ski body pivot axis and the ski adjuster.

22. The ski of claim 21, further comprising a handle extending upwards from the keel; and
wherein the ski body pivot axis extends through the ski body, the handle, and the keel.

* * * * *